(12) United States Patent
Takasaki et al.

(10) Patent No.: US 12,545,135 B2
(45) Date of Patent: Feb. 10, 2026

(54) EFFICIENT POWER TRANSFER TO ELECTRIC VEHICLES

(71) Applicant: INTERNATIONAL BUSINESS MACHINES CORPORATION, Armonk, NY (US)

(72) Inventors: Kenichi Takasaki, Shibuya (JP); Sanehiro Furuichi, Setagaya-ku (JP); Daisuke Maruyama, Yamato (JP); Tooru Tabara, Yokohama (JP); Yuhko Kanoh Hasegawa, Koto-ku (JP); Taku Sasaki, Machida (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 17/702,338

(22) Filed: Mar. 23, 2022

(65) Prior Publication Data

US 2023/0302937 A1 Sep. 28, 2023

(51) Int. Cl.
*B60L 53/62* (2019.01)
*B60L 53/12* (2019.01)
(Continued)

(52) U.S. Cl.
CPC ............... *B60L 53/62* (2019.02); *B60L 53/12* (2019.02); *G07C 5/004* (2013.01); *G08G 1/0129* (2013.01);
(Continued)

(58) Field of Classification Search
None
See application file for complete search history.

(56) References Cited

U.S. PATENT DOCUMENTS 8,030,888 B2 10/2011 Pandya et al.
8,531,162 B2 9/2013 Hafner et al.
(Continued)

FOREIGN PATENT DOCUMENTS

EP 3812197 A1 4/2021
JP 6095031 B1 3/2017
(Continued)

OTHER PUBLICATIONS

"EHighway—Electrification of road freight transport," Siemens, Printed Mar. 17, 2022, 15 pages https://www.mobility.siemens.com/global/en/portfolio/road/ehighway.html.
(Continued)

*Primary Examiner* — Christian Chace
*Assistant Examiner* — Shayne M. Gilbertson
(74) *Attorney, Agent, or Firm* — Stosch Sabo

(57) ABSTRACT

An ability of a power transmission device to transfer electric charge in a power-transmission area at a particular point in time is identified. The ability comprises a threshold number of vehicles to which the power-transmission device can transfer electric charge with at least a threshold efficiency. A predicted number of electric vehicles that are likely to be requesting electric charge within the power-transmission area at the particular point in time is calculated. The number of electric vehicles that are likely to be requesting electric charge within the power-transmission area at the particular point in time is adjusted based on a determination that the predicted number of vehicles is not bound by the threshold number of vehicles.

20 Claims, 7 Drawing Sheets

(51) Int. Cl.
   *G06Q 30/0283* (2023.01)
   *G07C 5/00* (2006.01)
   *G08G 1/01* (2006.01)
   *G08G 1/017* (2006.01)
   *G08G 1/0968* (2006.01)

(52) U.S. Cl.
   CPC ....... *G08G 1/017* (2013.01); *G08G 1/096811* (2013.01); *G06Q 30/0283* (2013.01)

(56) References Cited

U.S. PATENT DOCUMENTS

| | | | |
|---|---|---|---|
| 10,737,577 B2 | 8/2020 | Kapadia et al. | |
| 11,001,158 B2 | 5/2021 | Moghe et al. | |
| 2012/0306446 A1* | 12/2012 | Suganuma | B60L 53/30 701/119 |
| 2013/0035804 A1* | 2/2013 | Nakazawa | G08G 1/096716 701/1 |
| 2016/0185246 A1* | 6/2016 | Paul | B60L 53/65 320/106 |
| 2017/0088000 A1 | 3/2017 | Payne et al. | |
| 2017/0136889 A1* | 5/2017 | Ricci | B60L 53/126 |
| 2022/0402397 A1* | 12/2022 | Nishimura | B60L 53/62 |

FOREIGN PATENT DOCUMENTS

| | | |
|---|---|---|
| JP | 6408382 B2 | 10/2018 |
| JP | 2019068500 A | 4/2019 |
| JP | 2019161708 A | 9/2019 |
| JP | 2020064572 A | 4/2020 |
| JP | 2021006963 A | 1/2021 |
| JP | 2021061726 A | 4/2021 |
| JP | 2021078292 A | 5/2021 |

OTHER PUBLICATIONS

Patil et al., "Wireless Power Transfer for Vehicular Applications: Overview and Challenges," IEEE Transactions on Transportation Electrification, vol. 4, No. 1, Mar. 2018, 35 pages.
Gozalvez, "Advances in Wireless Power Transfer," Mobile Radio, IEEE Vehicular Technology Magazine, Dec. 2015, 7 pages.
Shirasaki et al., "Sensorless Vehicle Detection Using Vehicle Side Voltage Pulses for In-motion WPT," 2020 IEEE PELS Workshop on Emerging Technologies: Wireless Power Transfer (WoW), Nov. 15-19, 2020, 6 pages.
Sugita, A., How Utilities Can Lead The Electric Vehicle Revolution And Still Make A Profit, Retrieved from: https://blog.evsmart.net/electric-vehicles/utilities-to-make-money-with-electrification/, Mar. 19, 2019, 7 pages.

* cited by examiner

EFFICIENT POWER TRANSFER TO ELECTRIC VEHICLES

BACKGROUND

The present invention relates to charging electric vehicles, and more specifically, to charging electric vehicles during travel.

Passenger electric vehicles operate by utilizing electricity stored in an onboard battery or batteries rather than chemical fuel (e.g., gasoline, diesel). The batteries in an electric vehicle are sometimes charged when the vehicle is stationary.

In some instances, a battery of an electric vehicle could be charged while the vehicle is travelling. This is possible by creating an electrical contact between the electric vehicle and a transmission device, such as through overhead power lines. This is also possible through wireless power transmission.

SUMMARY

Some embodiments of the present disclosure can be illustrated as a method that comprises identifying an ability of a power-transmission device to transfer electric charge in a power-transmission area at a particular point in time. The ability of the power-transmission device comprises a threshold number of vehicles to which the power-transmission device can transfer electric charge with at least a threshold efficiency. The method further comprises calculating a predicted number of electric vehicles that are likely to be requesting electric charge within the power-transmission area at the particular point in time. The method also comprises determining that the predicted number of vehicles is not bound by the threshold number of vehicles. The method further comprises adjusting the number of electric vehicles that are likely to be requesting electric charge within the power-transmission area at the particular point in time based on that determination.

Some embodiments of the present disclosure can also be illustrated as a system that comprises a processor and a memory in communication with the processor. The memory contains instructions that, when executed by the processor, are configured to cause the processor to perform the above summarized method.

Some embodiments of the present disclosure can also be illustrated as a computer program product that comprises a computer readable storage medium. The computer readable storage medium has program instructions embodied therewith. Those program instructions are executable by a computer to cause the computer to perform the actions of the above summarized method.

DETAILED DESCRIPTION

Figure 1:
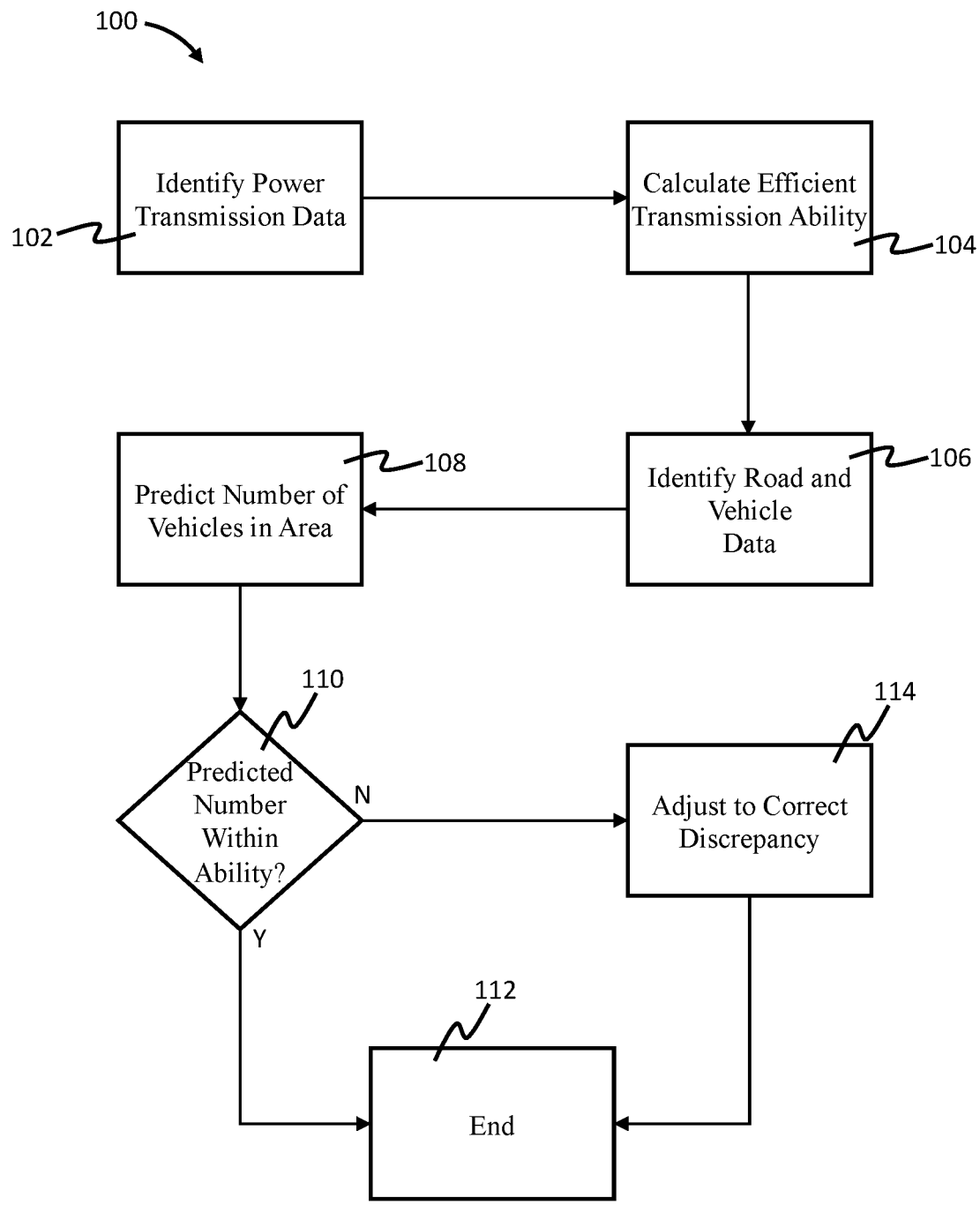
FIG. 1 discloses a method of adjusting a number of electric vehicles within a power-transmission area, in accordance with embodiments of the present disclosure.

Electric vehicles, such as electric passenger cars, busses, and transport trucks, are sometimes utilized as an alternative to vehicles that operate using traditional chemical fuels, such as gasoline or diesel. These electric vehicles typically result in fewer harmful environmental effects per mile travelled, and thus are sometimes preferred over chemical-fuel vehicles.

Adoption of electric vehicles is growing in urban areas in which trips are typically short and vehicles are able to recharge in a parking lot during the work day or in a garage overnight. However, adoption of electric vehicles is significantly slower in use cases that require frequent long trips, such as rural areas and in the transportation sector.

This slower adoption is due to the fact that the range of typical electric vehicles is far less than the range of a traditional chemical-fuel vehicle, and thus typical electric vehicle require recharging more frequently. Further, recharging a typical electric vehicle requires significantly more time than refueling a chemical-fuel vehicle. Because of this, stopping to recharge an electric vehicle at dispersed recharging stations on long trips can significantly increase the time required for the trip. Finally, because of the significant amount of time that one charging port may be in use by one electric vehicle, a recharging station in a rural area may be required to provide far more charging ports than a traditional fuel station may be required to provide chemical-fuel pumps.

To address these issues, efforts have been made into researching and developing infrastructure to provide electric charge to vehicles while they are travelling. These efforts sometimes involve contact charging, such as overhead charging lines with which a conductive portion of an electric vehicle makes contact while driving. These efforts also sometimes involve wireless power transfer, such as radiated electromagnetic energy, inductive coupling, or magnetic resonance coupling through a power-transmission device embedded within a road surface.

However, current technologies that can be utilized for charging electric vehicles during travel feature an efficiency curve based, in large part, on the number of vehicles currently being charged. For example, a single power-transmission device may be able to efficiently provide electric charge to 10 vehicles, 15 vehicles, or any number of vehicles between 10 and 15. However, the efficiency with which power is delivered may decrease significantly with 9 or fewer electric vehicles or with 16 or more electric vehicles. In other words, outside that efficiency range (expressed here as a number of vehicles accepting charge), a significant amount of electricity used to charge the electric vehicles may be lost.

Charging electric vehicles outside this efficiency range has several detriments. For example, the effective electricity required to charge a particular electric-vehicle battery may increase significantly when that battery is being charged outside the power-transmission device's efficiency range. When aggregated over many electric vehicles over time, this consequence may also significantly increase the electricity that must be produced to power those electric vehicles by, for example, a power plant. This, in turn, can increase the harmful environmental effects per mile travelled, counter acting against a primary benefit of electric vehicles.

Another detriment of charging outside an efficiency range may be incomplete charging of an electric vehicle. For example, a particular electric vehicle, such as a transport truck, may purposefully travel through a power-transfer area on a highway in order to achieve sufficient battery charge to reach its eventual destination after the power-transfer area. However, if one or more power-transmission devices is transferring power to that particular electric vehicle inefficiently, the particular electric vehicle may not reach the expected charge level at the end of the power-transfer area. This may prevent the particular electric vehicle from reaching its eventual destination without stopping at a stationary charging station, which may significantly increase the overall travel time. When this delay is aggregated over many transport vehicles, for example, the cost of transporting goods with electric vehicles over time may increase dramatically.

Some technologies do exist and have been proposed to address the above inefficiencies of charging a number of electric vehicles that is outside a power-transmission device's efficiency range. For example, some research has proposed charging electric vehicles wirelessly through inductors embedded within a travel lane of a road. However, the amount of current that must be directed through the coils of an inductor to provide charge to a large number of vehicles during heavy traffic (sometimes referred to herein as a "charge level" of current) is wasted if directed through those coils during light traffic when only a small amount of vehicles are present. Thus, some research proposes pulsing current through the coils of those inductors in very short bursts during a "search mode" to detect a number of electric vehicles on the road. In some instances, the charging system may only direct a charge level of current through the coils when a sufficient number of vehicles are detected by the search-mode inductor pulses.

The above technologies may help to prevent the negative effects of wasting electricity due to directing a charge level of current through inductors during periods of light traffic (or no traffic). However, it is of note that the described search-mode inductor pulses do still require electricity to operate. Thus, on roads that have long periods of light (or no) traffic and some periods of high traffic, a significant amount of electricity may be wasted in search mode during the long periods of light traffic. This may be common on roads that connect office portions of a city with residential portions of a city, on which a very high number of electric vehicles may be present for a few hours at the beginning and end of a workday, but very few number of electric vehicles may be present at other times. Thus, even though these proposed search-mode technologies may use less electricity than causing an inductor to operate in charging mode at all times, they may still waste far more electricity than is desired.

Some embodiments of the present disclosure address these and other issues by providing a computer system capable of managing the predicted and real-time number of vehicles in a power-transmission area in order to maintain efficient charging of the vehicles in that power-transmission area. In some embodiments of the present disclosure the computer system may, for example, adjust the properties of a power-transmission area, such as the speed limit for electric vehicles or direction of travel lanes in the power-transmission area. In some embodiments the computer system may also adjust the cost of charging in a power-transmission area, which may encourage some drivers to drive through the power-transmission area at times when the area is below an efficiency range (i.e., a range of charging vehicles to which a power-transmission device is capable of efficiently transferring electricity) or to drive through other power-transmission areas at time when the area is above an efficiency range.

In some embodiments of the present disclosure the computer system may also contact the drivers of electric vehicles to offer travel adjustments. For example, some travel adjustments may comprise a changed route that, if followed, would prevent or cause the electric vehicles to pass through the power-transmission area at a given time. In some similar embodiments, an offered travel adjustment may request that a driver of an electric vehicle to delay travel, travel sooner, travel faster, or travel slower in order to arrive at or exit a power-transmission area at a particular time. In some embodiments, these travel adjustments may be accompanied by incentives, such as a discount on future battery-charging fees if the travel adjustment is accepted by the driver of the electric vehicle.

In some embodiments of the present disclosure the computer system may calculate an efficiency range for a power-transmission area by analyzing real time and historical power-production data. This power production data may include, for example, weather data that may impact an ability to produce electricity (e.g., solar intensity at a nearby solar-panel field), planned energy production and availability at a nearby power plant, and stored power available to the power-transmission area. This calculated efficiency range may be expressed with one or more threshold number of vehicles. For example, the efficiency range could be expressed by a minimum number of vehicles that are required for efficient charging (e.g., a lower threshold) and a maximum number of vehicles that could be efficiently charged simultaneously (e.g., an upper threshold).

In some embodiments of the present disclosure the computer system may predict a number of electric vehicles that are likely to be within the power-transmission area at a particular point in time and compare that predicted number of vehicles to the efficiency range for the power-transmission area for that particular point in time. This predicted number of vehicles may be based upon real time and historical travel data. For example, the computer system may have access to GPS data for electric vehicles that are in or near a power-transmission area, routes that drivers of electric vehicles have entered into their mapping application, and scheduled requests electricity by a driver of an electric vehicle to charge the batteries of that electric vehicle at a particular point in time. The computer system may also have access to events that may affect travel, such as social events (e.g., sporting events), road construction, and road closures. Historical traffic patterns, such as traffic in a power-transmission area during rush hour and the last work day before a holiday weekend may also be analyzed by the computer system.

In some embodiments of the present disclosure, a computer system that is managing a power-transmission area may compare the predicted number of vehicles that are likely to be within the power-transmission area at a period of time to the calculated efficiency range for the power-transmission area for that period of time. If the computer system determines that the predicted number of vehicles is outside the efficiency range, the computer system may determine how to adjust the number of vehicles in the power-transmission area for that period of time.

In some embodiments, for example, the computer system may analyze a variety of data that may be relevant to rerouting traffic to or from the power-transmission area. For example, the computer system may analyze the battery-charge level of the vehicles that are predicted to be within the charging area during the particular point in time and determine whether any vehicles have sufficient charge level to travel by a different route that would not charge that vehicle's battery. The computer system may also analyze the speeds, positions, and planned routes of electric vehicles to determine whether an adjustment to any of those properties could increase or decrease the number of electric vehicles within the power-transmission area at the particular point in time. The computer system may also analyze the numbers of vehicles that are predicted to be within nearby power-transfer areas to determine whether any vehicles could be rerouted to or from those power transfer areas in a way that would adjust the number of electric vehicles within the particular power-transmission area at the particular point in time.

In some embodiments, the computer system may have access to profile data for the drivers of electric vehicles. This profile data may provide rerouting preferences that may impact whether those drivers would be likely to accept a changed route. For example, some drivers may be willing to leave for work 20 minutes earlier in the morning, whereas some may not be. Some drivers may be willing to take a less direct route to a destination, whereas some may not be. Some profiles may provide a maximum amount that a driver is willing to pay for charging the driver's battery, and some profiles may provide a maximum amount that a driver is willing to alter that driver's travel plans each month. In some embodiments, profile may also include data with respect to a vehicle's capabilities, such as the power-transfer methods by which a vehicle is capable of accepting electric charge. Example power-transfer methods may include wired or wireless transmission methods, such as electromagnetic coupling, magnetic field resonance, and microwave transmission.

In some embodiments of the present disclosure, a computer system may adjust a property of the power-transmission area itself rather than offering travel changes to drivers of electric vehicles. For example, if the number of predicted vehicles at a point in time is above an upper threshold of vehicles for the efficiency range at that time, the computer system may increase the speed limit in the power-transmission area to encourage vehicles in the area to exit the area faster. In some embodiments, a computer system that is managing a power-transmission area may have access to a system that controls a queue of vehicles into the area, such as a stoplight or gate. In those embodiments, the computer system may adjust the operation of that control system to adjust the flow of electric vehicles into the power-transmission area.

In embodiments in which the computer system is unable to determine an adjustment that would cause the number of charging vehicles within the area to be within the efficiency range for that power-transmission area, that computer system may decide to deactivate power transmission within the power-transmission area until the number of vehicles can be brought within the efficiency range. While this may prevent electric vehicles from benefitting from the power-transmission area, it may also prevent an inefficient, potentially wasteful transfer of electricity.

FIG. 1 illustrates a method 100 by which a computer system that is managing a power-transmission area may identify a need to adjust the number of electric vehicles in the power-transmission area. Method 100 may be performed, for example, by a computer system such as computer system 601. The computer system performing method 100 may include a database of or otherwise have access to power-production data (e.g., weather data related to power production, power-production schedules, and a quantification of stored electricity that is available to the power-transmission area), travel data (e.g., current positions, speeds, and routes of vehicles on the road, planned routes of vehicles, road closures) and adjustment data (e.g., abilities of nearby alternative power-transmission areas, preferences and restrictions listed in driver profiles, charge levels of nearby electric vehicles).

In some embodiments, the computer system performing method 100 may include or have access to one or more machine-learning systems (such as a neural network or combination of neural networks) that are trained to analyze power-production data, travel data, and adjustment data. This machine-learning system may, for example, be trained to identify correlations between current travel data, historical travel data, and historical numbers of vehicles within the power-transmission area. The machine-learning system may further be trained to predict, based on those correlations, a number of vehicles that is likely to request electric charge within the power-transmission area at a particular time.

Method 100 begins in block 102 in which the computer system identifies power transmission data relevant to the power-transmission area. This power transmission data may include a variety of data types that may be relevant to calculating an ability of a power-transmission device within the power-transmission area to transfer electric charge at a particular point in time.

For example, power-transmission data may take the form of power production schedules at a nearby power plant, and the extent to which the power plant would be able to increase production to meet increased demand. Power-transmission data may also include whether some of that power that is planned to be produced is available for purchase by an operator of the power-transmission area.

Power transmission data may also include weather information. Specifically, weather information that is relevant to an ability of a power-transmission device to transfer electric charge to an electric vehicle. This weather information may typically include properties of the weather that affect the ability of a nearby power plant (e.g., a solar panel, a hydroelectric dam, a wind turbine) to produce electricity that could be used by the power-transmission device.

For example, weather information may include whether an area is overcast or clear, cold or hot, raining, in a period of drought, windy or still, and the amount of water flowing through rivers/streams upstream of hydroelectric dams. This weather information may be historical, which may be useful for correlating with historical power production data. For example, the weather information may include the wind speed on a particular date and the amount of power produced by wind turbines on that date. Weather information may also be current weather data. For example, the weather information may include the intensity of sunlight shining on a solar panel or the amount of cloud cover near a field of solar panels. The weather information may also be forecast information. For example, the weather information may include the predicted temperature over the next week, or the predicted snow melt on a mountain throughout the upcoming summer season.

In some embodiments, power transmission data may include power usage data for the power grid surrounding the power-transmission area. For example, power transmission data may include the amount of electricity currently being utilized by homes or businesses in the region near the power-transmission area, which may provide information regarding the amount of electricity that is likely to be available for charging electric vehicles in the power-transmission area. Power transmission data may also include the typical power demand on a given date/time, such as the increase in power demanded when residents return home from work, the power demanded during a heat wave, or demand patterns during national holidays.

Upon identifying power transmission data in block 102, the computer system calculates, in block 104, an ability of a power-transmission device to efficiently transfer electric charge to electric vehicles in a power-transmission area at a particular time. In some embodiments, this ability may be based on the power available (or the predicted power available) to the power-transmission device at that particular time. This power availability may be based on the power-transmission data that was identified in block 102.

In some embodiments, this ability can be expressed as a numerical range of vehicles to which the power-transmission device can transmit electric charge simultaneously with a threshold efficiency. For example, the power-transmission device may be capable of simultaneously transmitting electric charge to 20 vehicles with an efficiency that is considered acceptable. However, if a $21^{st}$ vehicle begins to draw electric charge, the efficiency of transmission to the 21 vehicles may fall below an efficiency threshold. Similarly, if 15 vehicles suddenly leave the power-transmission area, the power-transmission device may still be capable of delivering efficiency to the remaining 5 vehicles with that acceptable efficiency. However, if another vehicle leaves, the efficiency of transmission to the 4 remaining vehicles may fall below that efficiency threshold. In this example, therefore, the efficient transmission ability may be expressed as a range of vehicles between 5 and 20, or as a pair of thresholds of number of vehicles (e.g., an upper threshold of 20 vehicles and a lower threshold of 5 vehicles).

Method 100 also includes identifying road and vehicle data in block 106. Road and vehicle data may include data that is available to the computer system and that may be relevant to the number of electronic vehicles that are likely to be within the transmission area at the particular time for which the ability was calculated in block 104. In other words, if block 104 included calculating a range of electric vehicles to which a power-transmission device could transfer electric charge with a threshold efficiency one hour into the future, block 106 would include identifying vehicle data that was relevant to the number of electric vehicles that are likely to be in the power-transmission area at one hour into the future.

Vehicle data may include, for example, GPS data for electric vehicles in the region near the power-transmission area, GPS data for electric vehicles that have requested to draw charge from the power-transmission device, routes programmed into the map system of nearby electric vehicles, the number of electric vehicles currently in the power-transmission area and the number of vehicles currently receiving electric charge from the power-transmission device. In some embodiments, vehicle data may also include the power-transfer method of one or more electric vehicles that are in the region or predicted to be within the region. Example power-transfer methods may include wired or wireless transmission methods, such as electromagnetic coupling, magnetic field resonance, and microwave transmission.

Road data that is identified in block 106 may include, for example, maps of the roads in the region, traffic signals and speed limits on those roads, road closures in the region, and others.

Of note, both road and vehicle data may include historical data (e.g., statistics) that can be correlated to available road and vehicle data that corresponds to the particular time for which an ability to transmit charge was calculated in block 104. For example, historical vehicle data may include the historical patterns with which a particular electric vehicle has passed through the power-transmission area. For example, a particular electric vehicle may request electric charge from the power-transmission device every typical week day at 6:30 AM and 5:30 PM, but not on weekends or regional common holidays. This particular electric vehicle may be identified in several ways, such as a camera in the power-transmission area photographing the vehicle's license plate or by recording the account number through which the owner of the vehicle purchases electric charge from the power-transmission area.

Historical road data may include generalized traffic patterns for the region, rather than for one particular electric vehicle. The historical generalized traffic patterns may, for example, provide an average number of vehicles on the road during every hour in every day of the week or for every date of the calendar. In some embodiments, the historical road data may also provide traffic patterns on holidays, local events (e.g., sporting events), and in the presence of nearby construction.

After identifying road and vehicle data in block 106, a computer system performing method 100 predicts, in block 108, a number of electric vehicles that are likely to be within the power-transmission area at the particular time for which the ability to transmit electric charge was calculated in block 104. This prediction may include comparing the available historical road and vehicle data identified in block 106 to road and vehicle data that corresponds to the particular time. For example, if the particular time for which the ability was calculated in block 104 is a Sunday during a regional festival, historical traffic patterns for previous Sundays during similar regional festivals (including, for example, the number of vehicles electric vehicles within the power-transmission area) may be analyzed. The number of vehicles predicted to be within the power-transmission area for the particular time may be based on the historical traffic patterns for those previous Sundays.

In some embodiments, the prediction in block 108 may be based on calendar data available for electric vehicles that are known to drive through the power-transmission area. For example, if 50% of the electrical vehicles that are historically within the power-transmission area times corresponding to the particular time (e.g., every Thursday at 7 AM)

have a meeting in another region at the particular time on their calendar, the number predicted in block 108 may assume that those vehicles would not be present at the particular time.

Similarly, the prediction in block 108 may also be based on preliminary requests for electric charge (e.g., reservations or pre-purchases for electric charge by owners of electric vehicles). For example, if a computer system performing method 100 has received a larger-than-normal reservations for electric charge for the particular time, the number predicted at block 108 may be increased accordingly.

In some embodiments, the prediction made in block 108 may be made by a machine-learning system, such as a neural network, to which a computer performing method 100 may have access. For example, the computer performing method 100 may include a database that stores identified data (e.g., power transmission data, road data, and vehicle data) as well as a predictive neural network.

Upon predicting the number of vehicles likely to be within the power-transmission area at the particular time for which the ability was calculated in block 104, the computer system determines, in block 110, whether the predicted number is within the number of vehicles that the power-transmission device has an ability to efficiently transfer charge. In some embodiments, this determination may take the form of comparing the predicted number of vehicles to a range of vehicles to which the power-transmission device can efficiently deliver electric charge. This range may, in some embodiments, take the form of an upper threshold (e.g., 30 vehicles) and a lower threshold (e.g., 15 vehicles). Thus, in some embodiments, determining whether the number of vehicles predicted to be within the power-transmission area is within the ability of the power-transmission device to transmit power to efficiently may comprise comparing the predicted number to an upper threshold number of vehicles, a lower threshold number of vehicles, or both.

If the computer system performing method 100 determines, in block 110, that the predicted number of electric vehicles is within the ability of the power-transmission device to transmit power efficiently, the computer system may determine that no further action is needed and end method 100 in block 112.

If, however, the computer system determines, in block 110, that the predicted number of electric vehicles is not within the range of vehicles to which the power-transmission device can efficiently transfer electric charge, the computer system performs an adjustment in block 114 to address that discrepancy. Generally, the adjustment performed in block 114 is designed to adjust the number of electric vehicles that are likely to be requesting electric charge within the power-transmission area at the particular time. Specifically, the nature of this adjustment may depend on whether the predicted number of vehicles is higher than the range to which the power-transmission device can efficiently deliver electric charge or lower than the range.

For example, a computer system performing method 100 may determine that the number of vehicles likely to be within the power-transmission area at the particular point in time is above the range of vehicles to which the power-transmission device can transfer electric charge with at least a threshold efficiency. In this situation, the computer system may issue rerouting information to one of the electric vehicles that is predicted to be within the power-transmission area (for example, an electric vehicle that drives through the power-transmission area every morning on the way to work). This rerouting information may, for example, contain a new route (i.e., a "changed route") that, if followed by the electric vehicle, would prevent the electric vehicle from driving through the power-transmission area. The nature of this rerouting information may depend upon the circumstances.

For example, the changed route may include changing the road on which the electric vehicle travels. This may be beneficial if the power-transmission area overlaps all lanes of a road on the previous route. In other circumstances, however, the changed route may allow the electric vehicle to drive on the same roads as in the previous route, but may restricting the electric vehicle from driving in a particular lane. This may be beneficial, for example, if the power-transmission area only overlaps an incomplete portion of the lanes on the road.

In some instances, the changed route contained in the rerouting information may redirect the electric vehicle to another power-transmission area that is predicted to have spare capacity at the particular time. This may be beneficial, for example, if the electric vehicle requires electrical charge during travel at the particular time in order to reach its destination.

In some instances, the changed route contained in the rerouting information may not actually change the path that the electric vehicle travels, but may change the time at which the electric vehicle travels that path. For example, the changed route may still permit the electric vehicle to pass through the power-transmission area, but may require that the electric vehicle do so 10 minutes later or 5 minutes earlier.

In another example, a computer system performing method 100 may determine that the number of vehicles likely to be within the power-transmission area at the particular point in time is below the range of vehicles to which the power-transmission device can transfer electric charge with at least a threshold efficiency. In this situation, the computer system may issue rerouting information to an electric vehicle that is predicted to be outside of the power-transmission area at the particular time.

For example, the changed route may request that the electric vehicle drives through the power-transmission area rather than another power-transmission area. This may be beneficial if nearby power-transmission areas are predicted to have a sufficient amount of electric vehicles requesting charge at the particular time that reducing that amount would still enable the power-transmission device to efficiently transfer electric charge to those electric vehicles.

In another example, the rerouting instructions may be sent to an electric vehicle that is likely to be within the power-transmission area at another time. In this example, the changed route may change the time that the electric vehicle is likely to be within the power-transmission area to the particular time. For example, the reroute instructions may request that an electric vehicle pass through the power-transmission area at 4:10 PM rather than 4:05 PM, or request that an electric vehicle pass through the power-transmission area on the way to work rather than on the way home from work.

The nature of the adjustment in block 114 may also depend upon the extent to which the number of predicted vehicles is outside of the range of electric vehicles to which the power-transmission device can efficiently transfer charge. For example, if the number of predicted electric vehicles is significantly above or below the range of vehicles, a large adjustment may be necessary to avoid inefficient transfer of charge. However, if the number of predicted electric vehicles is only slightly above or below the range of vehicles, a smaller adjustment may be performed to avoid overcorrecting. If the discrepancy is particularly large (e.g., if the number of predicted vehicles is so low that it is unlikely that an adjustment could bring the number of vehicles within the range of vehicles to which the power-transmission device can efficiently transfer charge), the adjustment in block 114 may include deactivating power transmission in the power-transmission area during the particular time. While deactivating power transmission would prevent any electric vehicles from charging at the particular time, it may be the only option available to prevent inefficient power transfer.

In some embodiments, the adjustment performed at block 114 may indirectly adjust the number of electric vehicles in the power-transmission area at the particular time. These adjustments may be referred to herein as indirect adjustments. An indirect adjustment, as used herein, refers to an adjustment that is not based on selecting one particular electric vehicle for rerouting, but broadly affects multiple vehicles in an attempt adjust the behavior of a sufficient number of vehicles. Indirect adjustments can be compared to direct adjustments, in which, for example, a particular set of rerouting instructions is developed for and sent to a particular electric vehicle.

One example of an indirect adjustment may include adjusting the cost of requesting/receiving electric charge in the power-transmission area. For example, if a computer system performing method 100 determines, in block 110, that a larger number of electric vehicles are predicted to be within the power-transmission area than can be efficiently charged, the computer system may, in block 114, increase the cost to receive electric charge in the power-transmission area during the particular time. This indirect adjustment may cause the drivers of some electric vehicles that would otherwise travel through the power-transmission area to choose to travel elsewhere in order to avoid the increased charging fees. Similarly, if too few electric vehicles are predicted to be requesting charge in the power-transmission area at the particular time, the computer system may, in block 114, decrease the cost of receiving electric charge during the particular time. This indirect adjustment may cause the drivers of some electric vehicles that would otherwise not have travelled through the power-transmission area to choose to do so in order to take advantage of the reduced charging fees.

Another example of an indirect adjustment may include adjusting the road properties in or around the power-transmission area. For example, if a computer system performing method 100 determines, in block 110, that there are likely to be too few electric vehicles in the power-transmission area at the particular time, the computer system may, in block 114, lower the speed limit in the power-transmission area at the particular time. By lowering the speed limit in the power-transmission area, the computer system may increase the amount of time that each vehicle that enters the power-transmission area remains within the power-transmission area. Thus, each particular vehicle that enters the power-transmission area may be less likely to leave the power-transmission area before several other vehicles enter the power-transmission area. This may, in aggregate, increase the amount of vehicles in the power-transmission area at the particular time.

Lane control is another example of adjusting the road properties in and around the transmission area. For example, a computer system performing method 100 may determine that there will be too few electric vehicles in a power-transmission area that includes two northbound traffic lanes at the particular time. In response, the computer system may close one of the two northbound lanes at the particular time. This adjustment may cause all electric vehicles that would have occupied both lanes to travel in a single lane, reducing the speed at which they can travel. This may, similar to lowering the speed limit, cause an aggregated increase in the amount of vehicles in the power-transmission area at the particular time.

Similarly, some indirect adjustments may include changing the direction of travel in a lane in the power-transmission area. For example, in some embodiments a power-transmission area may encompass a middle lane that is situated between one or more traffic lanes (e.g., a middle power-transmission lane that is between an eastbound lane and a westbound lane). In this example, a computer system performing method 100 may determine, in block 110, that too few electric vehicles are likely to be within the power-transmission area in the middle lane at a particular time. This may be because the middle lane is configured with an eastbound direction, but most traffic in the region travels westbound at the particular time (e.g., out of a city at the end of the work day). Thus, the computer system may change the direction of travel of the middle lane at the particular time from eastbound to westbound in block 114.

In the above example, changing the direction of travel of a lane in the power-transmission area may cause the direction of travel in the power-transmission area to align with the direction of travel of the majority of electric vehicles at the particular time. This, in turn, may significantly increase the amount of electric vehicles available to make use of the power-transmission area, which may help to maintain a number of vehicles in the power-transmission area that is within a range of vehicles to which a power-transmission device can efficiently transfer charge.

In some embodiments, a computer system performing method 100 may observe periodic traffic patterns that may result in a similar periodic schedule of changing the direction of travel of a lane in the power-transmission area. For example, in some regions, such as the edges of a business district, almost all traffic may travel in one direction (e.g., into the district) in the morning and in the opposite direction (out of the district) in the evening. In this example, a computer system performing method 100 may switch the direction of a lane in the power-transmission area every work day between the morning and the evening to account for these historical traffic patterns.

As noted above, a computer system performing method 100 may, in some instances, choose to deactivate a power-transmission device in block 114 if the predicted number of electric vehicles within a power-transmission area at a given time is sufficiently low. As noted, this may be the only option available to prevent inefficient power transfer when traffic is very low. In some embodiments, the computer system may observe periodic traffic patterns that may result in a similar periodic schedule of deactivating and reactivating a power-transmission device in a power-transmission area. For example, in some regions, such as a retail area, traffic may be very sparse during the typical work day, but significantly higher during the typical lunch hour and during the weekend. In this example, a computer system performing method 100 may deactivate a power-transmission device in the power-transmission area during the typical work day to avoid inefficient energy transfer to the few electric vehicles in the area at the time. However, the computer system may activate the power-transmission device in the middle of the day each typical work day (e.g., 11 AM to 2 PM Monday through Friday) and during the day of each weekend day.

Upon performing an adjustment in block 114, a computer performing method 100 may end method 100 in block 112. In some embodiments, this may involve repeating all or a portion of method 100 to analyze the efficacy of the adjustment in block 114. For example, in some embodiments, ending method 100 after an adjustment in block 114 may proceed from block 112 to block 106, at which point blocks 106 through 110 may be repeated after accounting for the adjustment in block 114.

In some embodiments, every iteration of block 112 may lead to the computer system performing a subsequent iteration of method 100 for the same particular time or another particular time. Thus, in some embodiments a computer system may perform method 100 regularly throughout the day.

In some embodiments, for example, a computer system may perform method 100 periodically for a specific time in the future or a time range in the future. For example, a computer system may perform method every 10 minutes for a specific time that is 30 minutes in the future. In this example, a computer system may perform method 100 at 10:00 AM for a particular time at 10:30 AM and again at 10:10 AM for a particular time at 10:40 AM.

In another example, a computer system may perform method 100 periodically for each 30-second time range (also referred to as a time interval). In this example, a computer system may perform method 100 at 10:00:00 AM for the time interval between 10:02:00 AM and 10:02:30 AM, and again perform method 100 at 10:00:30 AM for the time interval between 10:02:30 AM and 10:03:00 AM.

For the sake of understanding, FIGS. 2A-2B, 3A-3B, and 4A-4B depict schematic representations of power-transmission areas in which one or more adjustments to the number of electric vehicles that are likely to be requesting electric charge within a power-transmission area. The adjustments discussed with respect to FIGS. 2A-2B, 3A-3B, and 4A-4B may be performed, by example, a computer system performing a method similar to method 100.

Figure 2A:
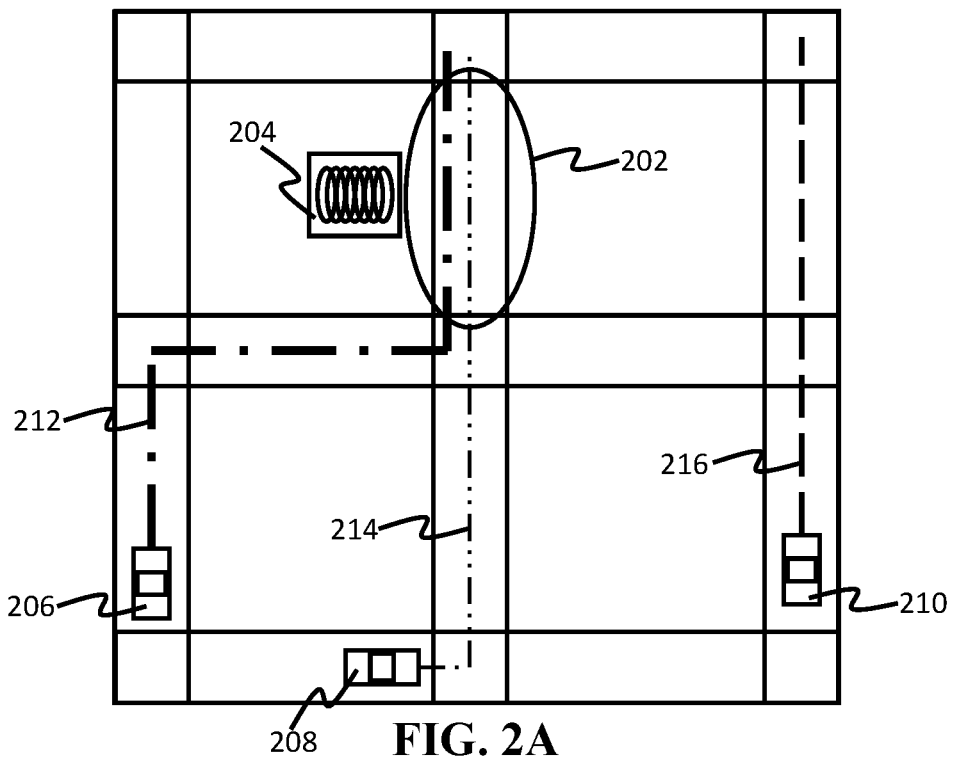
FIG. 2A discloses a schematic illustration of a power-transmission area before an adjustment to increase the number of electric vehicles in the area, in accordance with embodiments of the present disclosure.

FIG. 2A, for example, discloses a schematic illustration of a power-transmission area before an adjustment to increase the number of electric vehicles in the area, in accordance with embodiments of the present disclosure. FIG. 2A illustrates an overhead view of a region with a power-transmission area 202 (represented in FIG. 2A by an oval). Electric charge may be transmitted to electric vehicles that are within power-transmission area 202 by power-transmission device 204.

FIG. 2A illustrates the positions of 3 electric vehicles in the region: vehicle 206, vehicle 208, and vehicle 210. The positions of these electric vehicles in FIG. 2A may represent of the vehicles as detected or predicted by a computer system that is managing power-transmission area 202. In some instances, for example, these positions may be the current positions of vehicles 206-210 on the road near power-transmission area 202 as detected by analyzing the GPS data of the vehicles. In some instances, however, these positions may be predicted future positions of vehicles 206-210 at a future time. For example, a computer system may analyze the historical travel patterns or calendar information of the drivers of vehicles 206, 208, and 210 and determine that vehicles 206-210 may be in their illustrated positions in 24 hours in the future. In this example, the computer system may predict that all three of vehicles 206-210 may be parked in their respective garages/parking lots near power-transmission area 202 shortly before a particular time for which the computer system is performing method 100.

FIG. 2A also illustrates the predicted routes of vehicles 206, 208, and 210. Route 212 of vehicle 206 is represented by dashes and sets of one dot, route 214 of vehicle 208 is represented by dashes and sets of two dots, and route 216 of vehicle 210 is represented by dashes with no dots. Route 212 is presented with particularly thick dashes and dots to represent that vehicle 206 is expected to drive along route 212 particularly quickly. Route 216 is represented with moderately thick dashes to represent that vehicle 210 is expected to drive along route 216 at a moderate speed, and route 214 is represented with thin dashes and dots to represent that vehicle 208 is expected to drive along route 214 at a slow speed.

These routes may be predicted by a computer system that analyzes the historical traffic patterns of vehicles 206-210, calendars of the drivers of vehicles 206-210, data entered into map applications of vehicles 206-210, and others. Routes 212 and 214 show that the computer system predicts that vehicles 206 and 208 will travel through power-transmission area 202 but predicts that vehicle 210 will not. Further, the computer system may predict that both vehicles 206 and 208 will travel through power-transmission area 202 near a particular time (e.g., a particular time for which an ability of power-transmission device 204 to efficiently transfer electric charge is being calculated), but may predict that vehicles 206 and 208 may not both travel through power-transmission area 202 exactly at the particular time.

For example, a computer system may determine that vehicle 206 may have just exited power-transmission area 202 at the particular time and that vehicle 208 may be just entering power-transmission area 202 at the particular time. This may lead the computer system to predict that the number of electric vehicles requesting electric charge in power-transmission area 202 at the particular time may be lower than the range of electric vehicles to which power-transmission device 204 can provide power with at least a threshold efficiency. For example, power-transmission device 204 may be able to transmit electric charge to 3 vehicles with a 80% efficiency, but may be able to transmit electric charge to 1 vehicle with only a 20% efficiency. Further, the computer system may be required to operate power-transmission device 204 with at least 60% efficiency (i.e., an efficiency threshold of 60%). Thus, as only vehicle 208 is predicted to be in power-transmission area 202 at the particular time, power-transmission device 204 would not be able to transfer electric charge at the particular time with at least the threshold efficiency of 60%.

For this reason, a computer system managing the operations of power-transmission area 202 perform an adjustment to increase the number of vehicles in power-transmission area 202 at the particular time. This adjustment is illustrated in FIG. 2B.

Figure 2B:
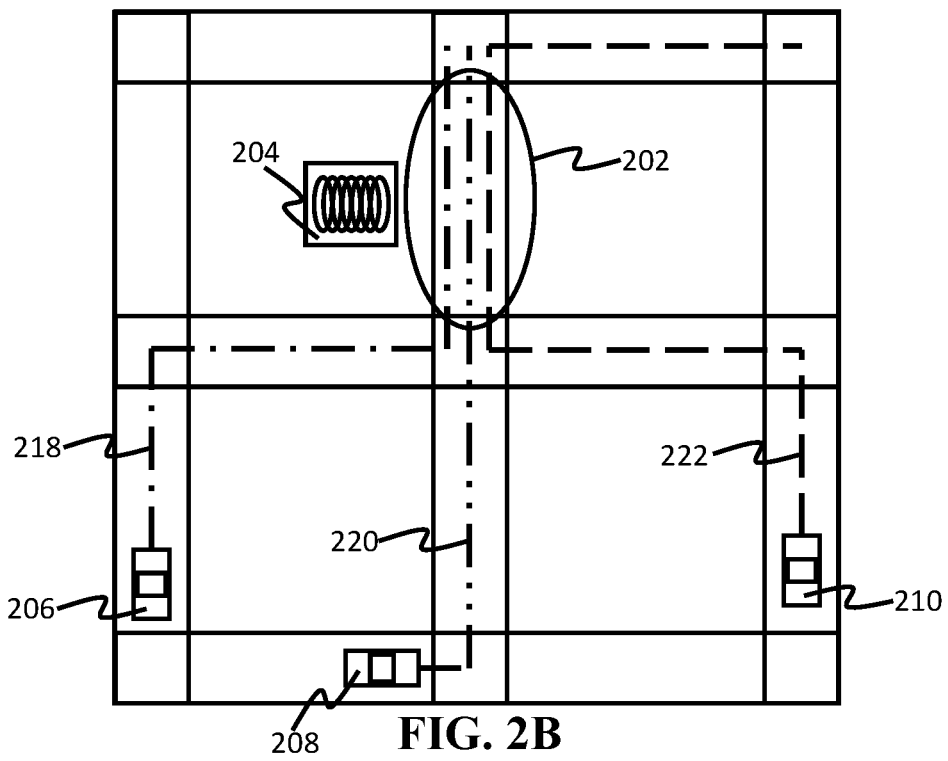
FIG. 2B discloses a schematic illustration of the power-transmission area after an adjustment to increase the number of electric vehicles in the area, in accordance with embodiments of the present disclosure.

FIG. 2B illustrates changed routes 218, 220, and 222 of electric vehicles 206, 208, and 210 that could be issued to the drivers of those vehicles as rerouting information by the computer system managing power-transmission area 202. These changed routes may, if followed, cause all of vehicles 206, 208, and 210 to be within power-transmission area 202 at the particular time, which may increase the efficiency to which power-transmission device 204 can transfer electric charge during the particular time from 20% to 80%.

For example, changed route 218, if followed by vehicle 206, would cause vehicle 206 to drive at a slower speed than route 212, causing vehicle 206 to arrive at power-transmission area 202 later and to stay within power-transmission area 202 for longer. Changed route 218 could be communicated to the driver of vehicle 206 by issuing reroute instructions to vehicle 206. The nature of these reroute instructions may depend on the circumstances.

If, for example, a computer system transmits the reroute instructions after identifying, through map-application data received from vehicle 206, that vehicle 206 is currently driving along route 212, the reroute instructions may request that vehicle 206 maintain its present course but reduce its speed. If, however, a computer system transmits the reroute instructions after identifying, through vehicle 206's historical travel patterns and calendar data, that vehicle 206 is likely to follow route 212 the next day, the reroute instructions may provide the directions for the route, the requested travel speed, and the requested departure time.

Similarly, changed route 220, if followed by vehicle 208, would cause vehicle 208 to drive at a faster speed than route 214, causing vehicle 214 to arrive at power-transmission area 202 earlier. Finally, changed route 222, if followed by vehicle 210, would cause vehicle 210 to drive at the same speed as route 216, but would also cause vehicle 210 to travel through power-transmission area 202.

As noted above, if all of changed routes 218, 220, and 222 were followed by vehicles 206, 208, and 210 respectively, all three vehicles may be receiving charge from power-transmission device 204 in power-transmission area 202 at the same time. Specifically, because of their changed speeds, vehicle 206 and 208 would be more likely to both be within power-transmission area 202 at the particular time. Further, the changed direction of vehicle 210 may cause it to be within the power-transmission area 202 at the particular time as opposed to on another road at the particular time.

As discussed previously, some adjustments performed by a computer system managing a power-transmission area may not take the form of reroute instructions/changed routes. This may be true in FIGS. 2A and 2B as well. For example, in some instances it may not be possible to transmit reroute instructions to vehicle 206, and thus it may not be possible to request that vehicle 206 reduce its speed before arriving at power-transmission area 202. However, it may still be possible to reduce the speed limit in power-transmission area 202 such that vehicle 206 spends more time in power-transmission area 202 and is still within power-transmission area 202 at the particular time when vehicle 208 enters power-transmission area 202.

Similarly, in some instances, the driver of vehicle 210 may be unwilling to change from route 216 to changed route 222 simply upon being issued a set of requested reroute instructions. However, the computer system could calculate the cost of charging within power-transmission area 202 at the particular time and alert the driver of vehicle 210 of that reduced cost. The driver of vehicle 210 may be willing to change his/her route at that point to drive through power-transmission area 202 in order to take advantage of that reduced cost.

Of note, only 3 vehicles are illustrated in FIGS. 2A and 2B. However, this is mainly for the sake of clear understanding. In actual use cases, far more vehicles may be present in the area near a power-transmission area and far more vehicles may be affected by adjustments made by a computer system managing power-transmission area 202. Further, in some embodiments, some vehicles may be considered for adjustments (such as issuing reroute instructions) but not selected. This may be for several reasons. For example, in some instances an electric vehicle may be considered for an adjustment, but may not be selected because the adjustments that may be necessary for the vehicle may be unsafe, unfeasible or otherwise undesirable. If, for example, a vehicle would be required to increase its speed to 80 mile per hour in a residential zone in order to reach a power-transmission area at a particular time, the vehicle may not be selected for adjustment due to safety reasons.

In some instances, an electric vehicle may be considered for an adjustment, but may not be selected for the adjustment because the driver of the electric vehicle would not accept the consequences of the adjustment. For example, a changed route may cause a vehicle that would otherwise not travel through a power-transmission area to travel through that power-transmission area. However, if that changed route would cause the driver of the vehicle to be late for work, the driver of the vehicle is unlikely to follow the changed route. Similarly, the changed route may require that a vehicle travel on a road that a driver of the vehicle refuses to drive on. In some instances, some drivers may prefer to only accept a maximum number of changed routes in a certain period of time (e.g., 3 changed routes each month). In these instances, a vehicle belonging to a driver that has already accepted 3 changed routes in that month may not be selected for a changed-route adjustment.

Thus, in some embodiments of the present disclosure, a computer system that is managing a power-transmission area may have access to profile data for the electric vehicles that are considered for adjustments such as reroute instructions. This profile data may include preferences of the driver(s) of the vehicle with respect to changed routes, as well as restrictions. For example, the profile for a vehicle may provide that a driver is typically willing to accept reroute instructions on weekends but not weekdays, willing to accept reroute instructions that do not increase the number of traffic lights through which the driver travels, willing to accept reroute instructions as long as they would not increase the travel time of the route by over a percentage threshold, or willing to accept reroute instructions as long as they do not cause the battery of the electric vehicle to drop below a threshold charge level.

In some embodiments, these reroute instructions may be provided by one or more drivers of an electric vehicle or learned by the computer system by analyzing historic driving patterns of the vehicle and previous acceptances or rejections of reroute instructions by the vehicle. The reroute preferences applied to a vehicle may be compared to the consequences of a potential reroute instruction to determine whether a driver of the vehicle would be likely to accept or reject. If the driver is likely to reject the reroute instruction, another vehicle may be selected for rerouting instead. More information regarding driver profiles and reroute preferences is provided in the discussion of FIG. 5.

Figure 3A:
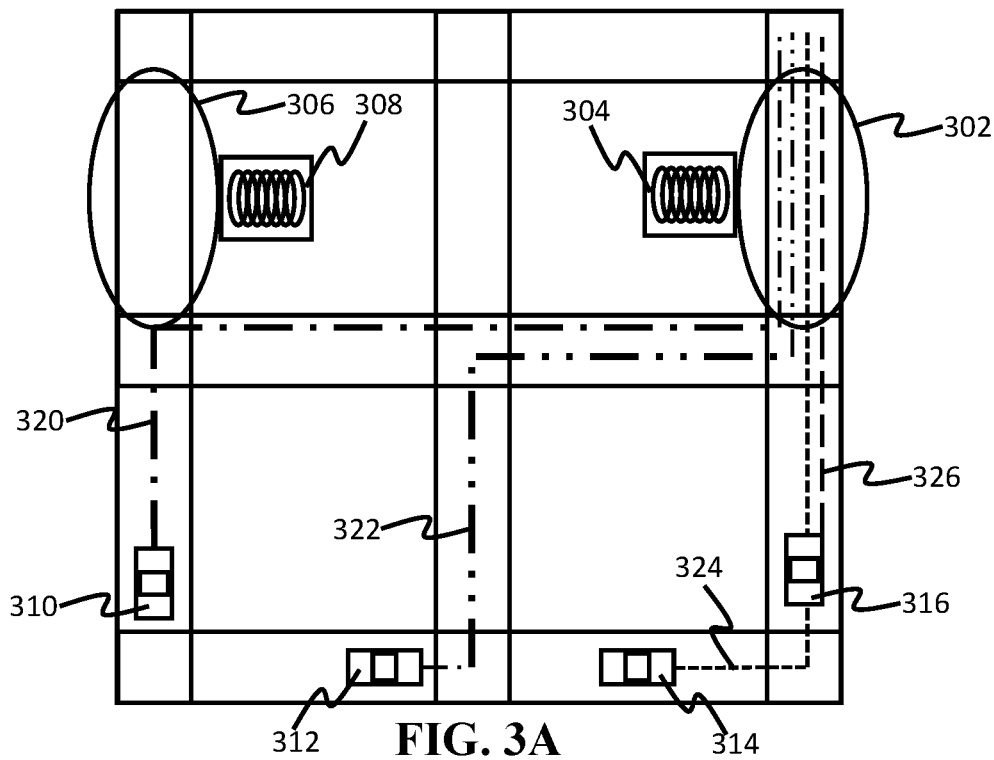
FIG. 3A discloses a schematic illustration of a pair of power-transmission areas before an adjustment, in accordance with embodiments of the present disclosure.

FIG. 3A discloses a schematic illustration of a power-transmission area before an adjustment to decrease the number of electric vehicles in the area, in accordance with embodiments of the present disclosure. FIG. 3A illustrates an overhead view of a region with power-transmission areas 302 and 306 (represented in FIG. 3A by ovals). Electric charge may be transmitted to electric vehicles that are within power-transmission areas 302 and 306 by power-transmission device 304 and 308 respectively.

FIG. 3A illustrates the positions of 4 electric vehicles in the region: vehicle 310, vehicle 312, vehicle 314, and vehicle 316. FIG. 3A also illustrates the routes that each vehicle is predicted to follow. For example, vehicle 310 is predicted to follow route 320, which is illustrated by dashes and sets of 1 dot. Vehicle 312 is predicted to follow route 322, which is illustrated by dashes and sets of 2 dots. Vehicle 314 is predicted to follow route 324, which is illustrated by short dashes. Vehicle 316 is predicted to follow route 326, which is illustrated by long dashes. As in FIGS. 2A and 2B, the thickness of the dashes and dots of each of routes 320-326 are intended to roughly depict the relative speeds at which the corresponding vehicles are predicted to travel.

A computer system that is managing power-transmission area 302 may determine that the routes and speeds of each of vehicles 310-316 suggests that, at a particular time, all four of vehicles 310-316 are predicted to be requesting charge in power-transmission area 302. This particular time may be a time in the future depending upon the particular embodiment. For example, in some embodiments the particular time may be 30 seconds into the future, 30 minutes into the future, or 30 days into the future. The computer system that is managing power-transmission area 302 may predict, however, that power-transmission device 304 may be unable to efficiently transfer charge to more than 3 vehicles simultaneously at the particular time. Thus, the computer system that is managing power-transmission area 302 may attempt to make an adjustment to reduce the number of vehicles in power-transmission area 302 at the particular time.

Figure 3B:
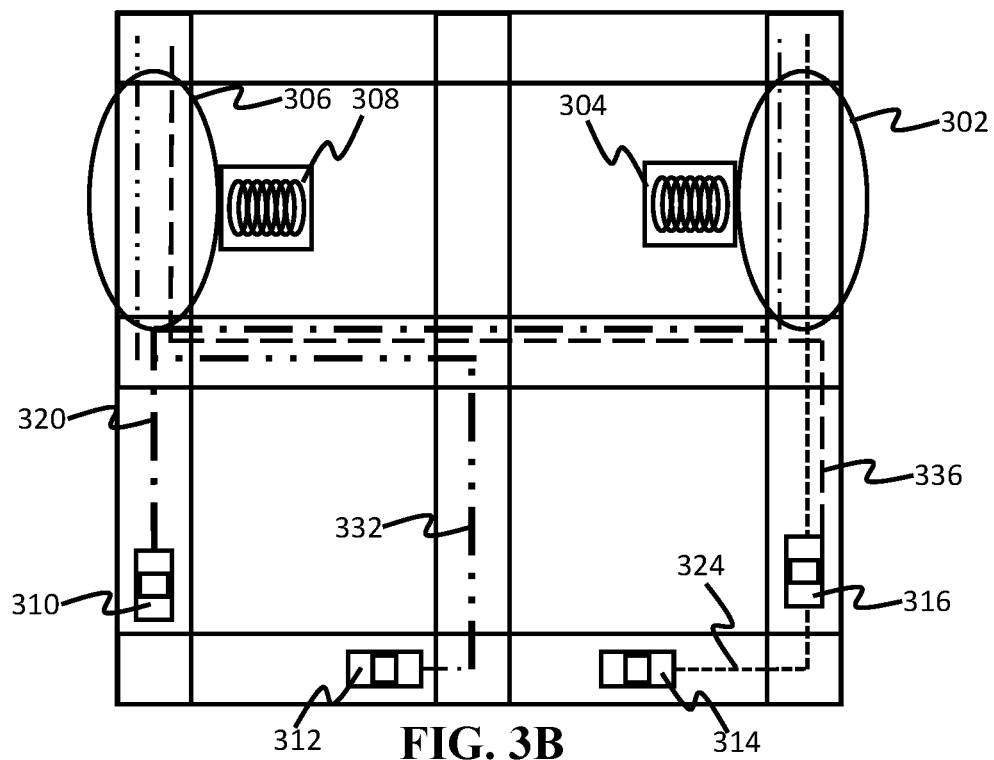
FIG. 3B discloses a schematic illustration of the pair of power-transmission areas after an adjustment, in accordance with embodiments of the present disclosure.

FIG. 3B illustrates the predicted routes of each of vehicles 310-316 after the adjustment. Specifically, FIG. 3B illustrates changed routes 332, and 336 of vehicles 312 and 316 respectively; predicted routes 320 and 324 of vehicles 310 and 314 are not predicted to be affected by the adjustment. As a result of the adjustment, therefore, only vehicle 310 and 314 are predicted to be requesting charge in power-transmission area 302 at the particular time; vehicles 312 and 316 are predicted to be within power-transmission area 306 at the particular time.

This adjustment may be performed in several ways. Similar to the adjustment discussed with respect to FIGS. 2A and 2B, a computer system may have issued reroute instructions to vehicles 312 and 316 requesting them to travel through power-transmission area 306 rather than 302. In some embodiments, this may involve predicting a consequence of the adjustment (i.e., the consequence of following the changed route in the reroute instructions) for each vehicle. Example consequences may be, for example, change in arrival time (e.g., a 2-minute delay), change in the number of intersections on the route, change in the number of traffic signals (e.g., stop lights and stop signs) in the changed route, change in distance travelled, and others.

In some embodiments, the predicted consequences may be compared to preferences or restrictions in a profile for each vehicle. Based on that comparison, the computer system managing power-transmission area 302 may predict the vehicles that would follow a changed route in the reroute instructions. Reroute instructions may be issued to vehicles that are predicted to follow the changed routes. For example, the computer system may have analyzed potential changed routes for all of vehicles 310-316 and determined that vehicles 312 and 316 would follow the changed routes. The computer system may also have determined that vehicles 310 and 314 would have followed changed routes as well, but may have only selected and issued reroute instructions to vehicles 312 and 316 in an attempt to keep a minimum number of vehicles within power-transmission area 302 at the particular time. The computer system may also have determined that at least one of vehicles 310 and 314 would not have followed a changed route, and thus not selected either of vehicles 310 or 314 for issuing rerouting information.

In some embodiments, a computer system that is managing power-transmission area 302 may have information regarding the number of vehicles that are predicted to be requesting charge in power-transmission 306 at or around the particular time. For example, in some embodiments the computer system that is managing power-transmission area 302 may have transmitted a query to a second computer system that is managing power-transmission area 306. That second computer system may have sent the information to the computer system in response. In some embodiments, the computer system that is managing power-transmission area 302 may be the same computer system that is managing power-transmission area 306, and thus may have the same access to both sets of information.

In some embodiments, therefore, the computer system that is managing power-transmission area 302 may be aware that power-transmission device 308 is, unlike power-transmission device 304, predicted to have an ability to transmit power to a greater number of electric vehicles than are predicted to be within power-transmission area 306 at the particular time. In other words, the computer system may determine that power-transmission device 308 has an excess of power-transmission ability. In fact, power-transmission device 308 may be unable to efficiently transmit electric charge to the number of electric vehicles that are predicted to be within power-transmission area 306 at the particular time because the number of electric vehicle may be below a lower efficiency threshold for power-transmission device 308.

In these examples, the computer system that is managing power-transmission area 302 may at least determine that power-transmission area 306 has the capacity to accept the number of electric vehicles that are necessary to remove from power-transmission area 302 in order to enable power-transmission device 304 to efficiently transfer electric charge to all vehicles within power-transmission area 302. In fact, in some of these examples, the computer system may determine that power-transmission device 308 may actually transfer electric charge more efficiently if those excess vehicles are redirected from power-transmission area 302 to power-transmission area 306.

In some of these examples, the computer system that is managing power-transmission area 302 may issue reroute information to vehicles 312 and 316. That reroute information may include a changed route that requests each vehicle to travel through power-transmission area 306 rather than power-transmission area 302. In some embodiments, rather than issuing reroute instructions, a computer system that is managing power-transmission area 302 may be able to adjust the fees that are paid by the drivers of vehicles 312 and 316 when those vehicles accept electric charge from one or both of power-transmission devices 304 and 308. For example, the computer system may increase the cost of electric charge in power-transmission area 302, decrease the cost of electric charge in power-transmission area 306, or both. These fee adjustments may be transmitted to vehicles 312 and 316 in order to encourage the drivers of those vehicles to travel through power-transmission area 306 rather than power-transmission area 302. In some of these embodiments, the fee adjustments may apply to all electric vehicles in power-transmission areas 302 and 306 at the particular time. In some embodiments, the fee adjustments may only apply to electric vehicles 312 and 316. In either embodiment, the computer system that is managing power-transmission area 302 may have analyzed profiles (e.g., driver preferences and travel history) for vehicles 312 and 316 to identify the smallest rate adjustment that may be required to redirect vehicles 312 and 316 to power-transmission area 306.

Of note, the adjustment in FIGS. 3A and 3B is discussed herein as resulting in vehicles 312 and 316 requesting electric charge from power-transmission area 306 at approximately the same time (i.e., the particular time) at which vehicles 310 and 314 are requesting electric charge from power-transmission area 302. This may be beneficial in use cases in which power-transmission device 304 and power-transmission device 308 are located on separate regional power-transmission network systems (e.g., separate local electric grids). However, in use cases in which both power-transmission device 304 and power-transmission device 308 are located on the same regional power-transmission network system (e.g., a local electric grid) it may also be beneficial to cause vehicles 312 and 316 to request electric power from power-transmission device 308 at a different time than vehicles 310 and 314 are requesting electric charge from power-transmission device 304. This may help to avoid exceeding the power capacity of the power-transmission network system.

Figure 4A:
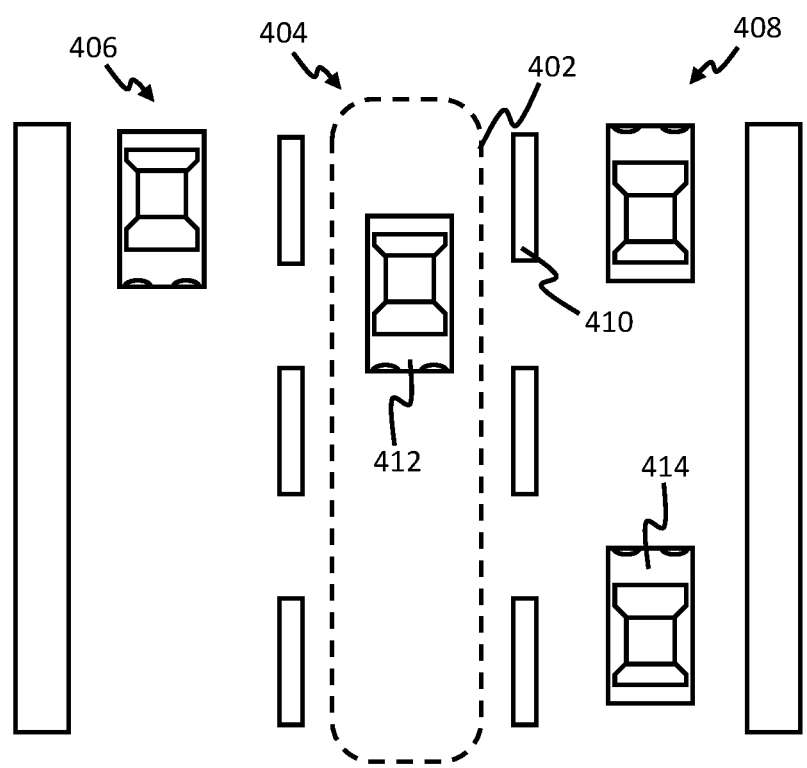
FIG. 4A discloses a schematic illustration of a power-transmission area before a lane-control adjustment, in accordance with embodiments of the present disclosure.

FIG. 4A discloses a schematic illustration of a power-transmission area 402 before a lane-control adjustment, in accordance with embodiments of the present disclosure. Power-transmission area 402 is illustrated as middle lane 404 between left lane 406, which has a first direction (e.g., southbound), and right lane 408, which has a second direction (e.g., northbound) that is opposite the first direction. In FIG. 4A, power-transmission area 402 is illustrated as having the same direction as right land 408 (i.e., the second direction). As illustrated, standard lane divider lines (e.g., line 410) demarcate middle lane 404, 406, and 408, but in some use cases middle lane 404 may be physically separated from left lane 406 and right lane 408 (for example, with concrete barriers, with a wall, or with elevation).

The depiction illustrated in FIG. 4A represents the number of vehicles that are predicted to be driving within power-transmission area 402 at a particular time. This predicted number of vehicles may have been predicted by a computer system that is managing power-transmission area 402. As illustrated, power-transmission area 402 is only predicted to contain one electric vehicle 412 at the particular time. Further, right lane 408 is also predicted to contain one electric vehicle 414 at the particular time. This simplified presentation is intended to facilitate understanding. Realistically, vehicles 412 and 414 may represent several vehicles in an actual use case. The number of vehicles represented by vehicles 412 and 414 may depend on the circumstances. In use cases with typically sparse traffic and small power-transmission areas, for example, vehicles 412 and 414 may each represent two vehicles. In use cases with typically congested traffic and large power-transmission areas, vehicles 412 and 414 may each represent fifteen vehicles. For the sake of understanding, however, all vehicles depicted in FIGS. 4A and 4B will be described as representing one vehicle for the remainder of this discussion.

The computer system managing power-transmission area 402 may be capable of identifying an ability of a power-transmission device to efficiently transfer electric charge to vehicles within power-transmission area 402 at the particular time. As part of that identification, the computer system may determine a range of vehicles (e.g., an upper threshold and lower threshold) to which the power-transmission device can transfer electric charge with at least a threshold efficiency at the particular time.

For example, the computer system may determine that, at the particular time, electric charge could not be transferred to fewer than two electric vehicles with at least a threshold efficiency. In other words, the range of electric vehicles to which the power-transmission device could efficiently transfer electric charge would have a lower threshold of two vehicles. In this example, the computer system would determine that the power-transmission device would be unable to efficiently transfer electric charge to the vehicles in the power-transmission area 402 at the particular time, because only one electric vehicle (vehicle 412) is predicted to be within power-transmission area 402 at the particular time. In other words, the computer system would determine that the predicted number of vehicles is not bound by the lower threshold of two vehicles. For this reason, the computer system may adjust the number of vehicles that are likely to be requesting electric charge within power-transmission area 402 at the particular time.

As discussed previously, such an adjustment may take several forms depending on the analysis the computer system is able to perform on data available to it. These data may include, for example, historical traffic data near power-transmission area 402, information regarding expected road construction or closures near power-transmission area 402, information regarding local events near power-transmission area 402, and expected weather at the particular time.

As a result of analyzing that and other information, the computer system may determine that only one electric vehicle is predicted to be requesting electric charge within power-transmission area 402 at the particular time because of the direction of power-transmission device 402 (e.g., southbound) at the particular time. Similarly, the computer system may predict that a larger number of electric vehicles would be likely to travel in power-transmission area 402 at the particular time if the direction of middle lane 404 were switched to the same direction as right lane 408 (e.g., northbound).

Figure 4B:
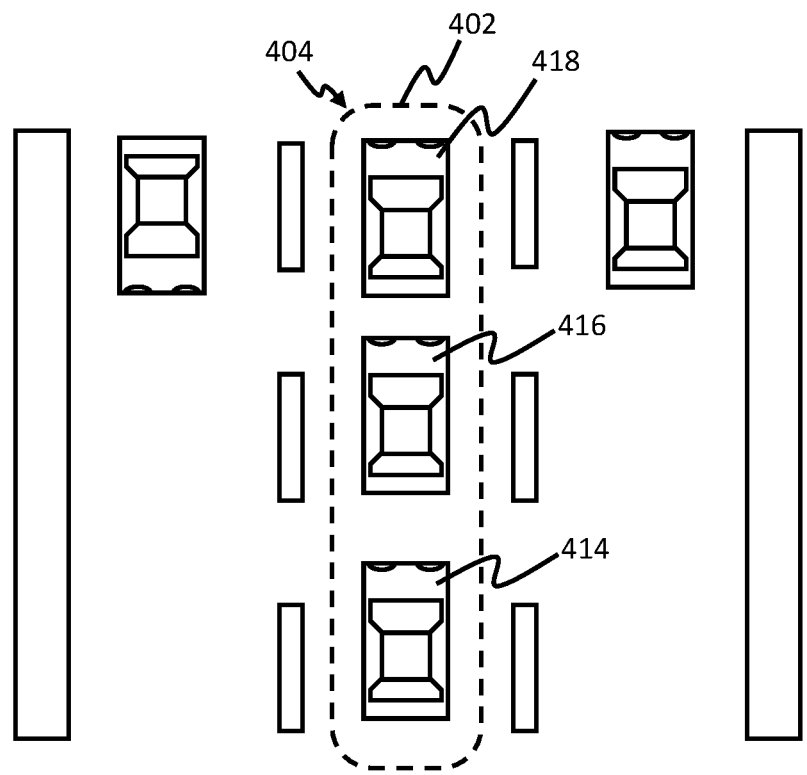
FIG. 4B discloses a schematic illustration of a power-transmission area after a lane-control adjustment, in accordance with embodiments of the present disclosure.

The result of this adjustment is illustrated in FIG. 4B. Specifically, the computer system has predicted that three electric vehicles, vehicles 414, 416, and 418, all would be likely to travel within power-transmission area 402 if the direction of middle lane 404 were switched. This would cause the predicted number of vehicles to be bound by the lower threshold number of vehicles (i.e., two vehicles) to which the power-transmission device could transfer electric charge with at least a threshold efficiency. In other words, the number of vehicles that is predicted to be requesting electric charge within the power-transmission area at the particular time would be within the range of vehicles to which the power-transmission device could efficiently transfer electric charge.

The predictions illustrated in FIGS. 4A and 4B may occur in various real-life circumstances that may be analyzed and identified by a computer system that is performing the methods of the present disclosure. For example, if the particular time occurs during rush hour (e.g., at the beginning of the day when many drivers are commuting to work), traffic in middle lane 404 may have been travelling opposite of rush-hour traffic at the particular time (e.g., away from a downtown area). In another example, traffic in middle lane 404 in FIG. 4A may have been travelling away from a large stadium or event grounds shortly before a large sporting event, concert, or festival. Similarly, lanes 404, 406, and 408 may provide travel towards and from a popular vacation area for a large city (e.g., a chain of lakes or ski area), and the weather may indicate that an unusually high number of vehicles are likely to travel towards that vacation area at the particular time. For example, unusually sunny and warm weather in early autumn may cause a large number of vehicles to exit the city towards a chain of lakes, and a deluge of snow at the beginning of ski season may cause a large number of vehicles to exit the city towards a ski area. In any of these examples, the computer system may determine that the direction travel in power-transmission area 404 is opposite the direction that most vehicles in the area are likely to travel at the particular time, and thus may reverse the direction of middle lane 404.

Figure 5:
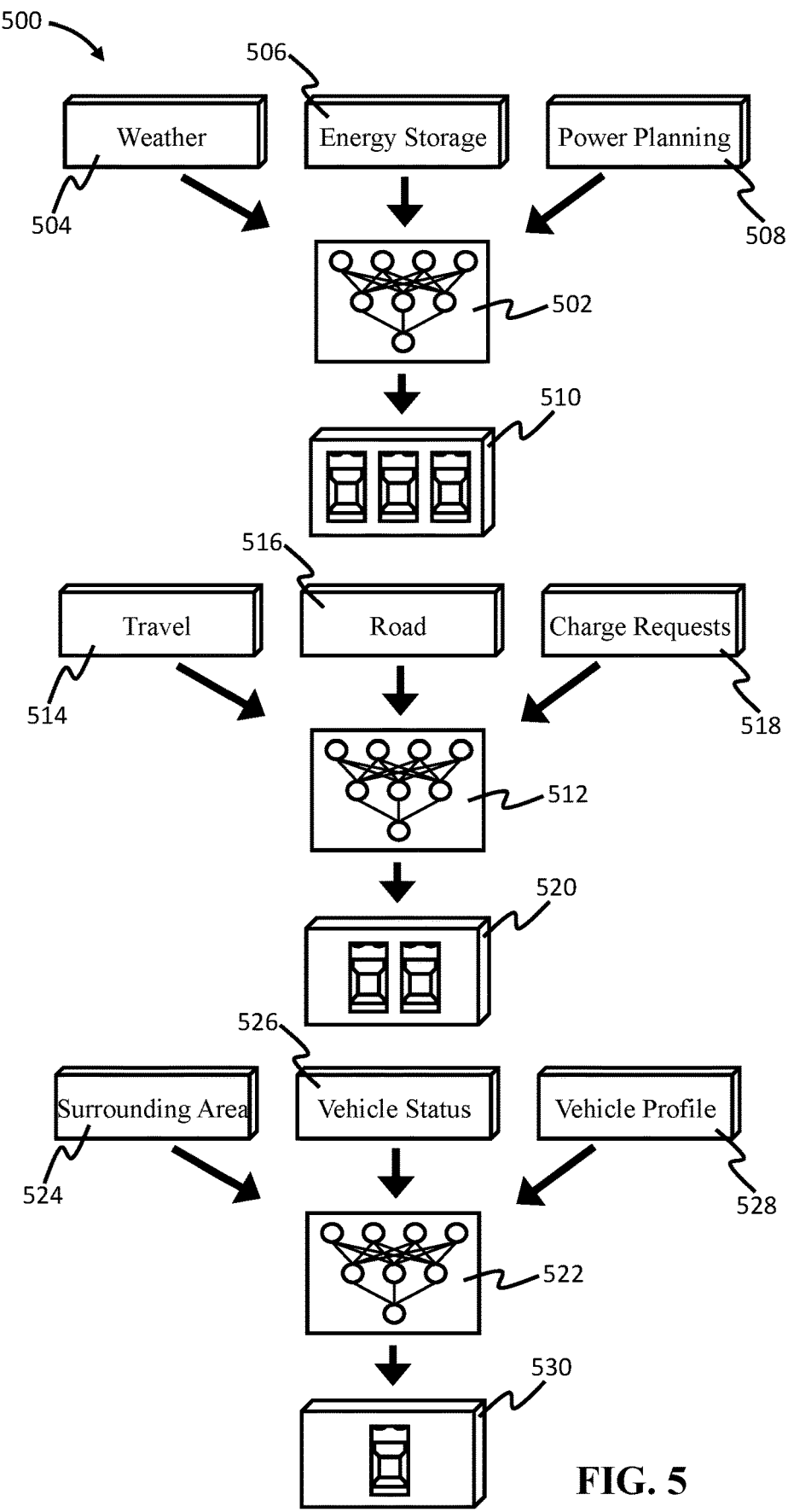
FIG. 5 discloses a system of predicting an ability to efficiently transmit power in a power-transmission area, predicting a number of vehicles in the power-transmission area, and identifying an adjustment to the power-transmission area in accordance with embodiments of the present disclosure.

FIG. 5 discloses a flowchart 500 by which a computer system that is managing a power-transmission area could ingest various data types and output various predictions in accordance with embodiments of the present disclosure. Of note, FIG. 5 provides only an abstract presentation of example data types and processing components for the purposes of understanding.

For example, a computer system that is managing a power-transmission area (sometimes referred to with respect to FIG. 5 as the "managing computer system") may make use of a first machine-learning system 502. Machine-learning system 502 may take the form, for example, of a predictor neural network. Machine-learning system 502 may be trained to ingest and analyze various data and output an ability of a power-transmission device to transfer electric charge at a particular point in time. Machine-learning system 502 may be, for example, a component of the managing computer system or a model that is part of another computer system that the managing computer system utilizes for predictions.

As illustrated in FIG. 5, the managing computer system inputs a set of weather data 504, a set of energy-storage data 506, and a set of power-planning data 508 into machine-learning system 502. These data may all be used by machine-learning system 502 to predict, for example, a number of electric vehicles to which a power-transmission device within the power-transmission area could efficiently transfer electric charge. This number may take the form of a lower threshold, an upper threshold, or both. For example, in some embodiments machine-learning system 502 may output an upper threshold, which may set the maximum number of electric vehicles to which a power-transmission device could transfer charge before the transfer fell below a threshold efficiency. That upper threshold could, in some embodiments, be combined with a corresponding threshold to produce a range of vehicles to which the power-transmission device could deliver electric charge with at least a threshold efficiency.

Weather data 504 may include current weather activity, historical weather, and a forecast of what the weather is predicted to be at the particular time for which an ability of the power-transmission device is being calculated. Weather data 504 may include, for example, the extent to which the sky is overcast with clouds or clear of clouds, the percentage of solar panels in a solar farm in direct sun, cloud movements, the temperature, short-term rain patterns (e.g., is it currently raining), long-term rain patterns (e.g., is the area in a period of drought), and amount of wind.

Energy-storage data 506 may include, for example, the amount of electrical energy stored in energy-storage units (e.g., batteries) that could be used for transmission of electric charge to electric vehicles and the properties of the energy storage units (e.g., storage form, ramp up time, restrictions on use).

Power-planning data 508 may include data pertaining to production and usage of electricity in the nearby electrical grid. For example, the historical production patterns of nearby power plants may be included, as well as the historical demand for electricity by the grid. For example, if calculating an ability to transmit electrical charge at 5:30 PM on a particular day (i.e., the particular time), power-planning data may both include the typical production of a power plant at that time, as well as the spike in electricity consumed by the residential grid when a large portion of the population gets home from work. This may suggest that power may be scarce at the particular time and that the power-transmission device may be able to efficiently transmit electric charge to few vehicles at the particular time. Whether a power plant has already committed to sell all power that it is planning to produce during the particular time may also be included in power-planning data.

Machine-learning system 502 may analyze the historical, current, and forecasted weather data 504, energy-storage data 506, and power-planning data 508. Upon performing this analysis, machine-learning system 502 may output a predicted ability 510. Predicted ability 510 may take the form of a lower threshold of vehicles to which a power-transmission device could deliver power with at least a threshold efficiency. In other words, predicted ability 510 may take the form of a minimum number of electric vehicles to which the power-transmission device must transfer electric charge during the particular time in order to maintain a minimum transfer efficiency. As illustrated in FIG. 5, that minimum number of electric vehicles is 3. Of note, the number portrayed in FIG. 5 is smaller than is likely in actual use cases for the sake of understanding. In some use cases, the minimum number predicted by machine-learning system 502 may be 30, in which case each vehicle illustrated in predicted ability 510 may represent 10 vehicles.

The managing computing system also utilizes a second machine-learning system 512, which may be trained to ingest and analyze various data and output a predicted number of vehicles that are likely to be requesting electric charge within the power-transmission area at the particular point in time. Similar to machine-learning system 502, machine-learning system 512 may be a component of the managing computing system or a component of a separate computing system. Machine-learning system 512 may also be a part of the same computing system as machine-learning system 502 or a separate computing system.

The managing computing system inputs a set of travel data 514, a set of road data 516, and a set of charge request data 518 into machine-learning system 512. Machine-learning system 512 may use these data to predict a number of vehicles that are likely to be requesting electric charge within the power-transmission area at the particular point in time.

Travel data 514 may include, for example, historical and current measurements from a GPS that is associated with an electric vehicle in the region near the power-transmission area. For example, machine-learning system 512 may receive a current location of an electric vehicle from the vehicle's GPS, compare that current location to historical locations of the electric vehicle shortly before the vehicle passed through the power-transmission area, and predict whether the vehicle is likely to be within the power-transmission area at the particular point in time based on that analysis. Travel data 514 may also include historical and current routes that have been entered into a map application in the vehicle's user interface or in a device connected to the vehicle (e.g., a smart phone). Travel data may also include travel history, such as the days and times at which the vehicle typically is present within the power-transmission area.

Road data 516 may include, for example, current and historical traffic patterns near the power-transmission area. Machine-learning system 512 may determine, for example, that traffic is very congested near and including the power-transmission area throughout each Saturday and Sunday. Road data 516 may also include, for example, nearby traffic jams, road construction, and road closures. Road data 516 may also include data regarding nearby events and calendar data that may impact traffic near the power-transmission area, such as historical and current holidays, sporting events, festivals, and others.

Charge requests 518 may include, for example, a number of historical and current requests to charge a vehicle's battery within the power-transmission area. Machine learning system 512 may, for example, identify a number of drivers that have paid, in advance, for the cost of charging an electric vehicle at the particular time (i.e., a pre-paid reservation to charge one's electric vehicle). Correlations between that number and historical pre-paid reservations and actual numbers of vehicles within the power-transmission area at the time of those historical pre-paid reservations may be utilized by machine-learning system 512.

Machine-learning system 512 outputs a predicted number of electric vehicles 520. Predicted number of vehicles 520 represents the number of vehicles that, according to machine-learning system 512, are likely to be within the power-transmission area requesting power at the particular time. As illustrated, predicted number of vehicles 520 is only 2 vehicles, which is one vehicle less than the minimum number of vehicles predicted as part of predicted ability 510. The managing computing system may determine, therefore, that the predicted number of vehicles 520 is not bound by the threshold number of vehicles in predicted ability 510. The managing computing system may then determine that an adjustment to the number of electric vehicles that are likely to be requesting electric charge within the power-transmission area at the particular point in time is necessary.

The managing computing system may thus utilize machine-learning system 522 to select an electric vehicle to issue rerouting information to. Similar to machine-learning system 502 and machine-learning system 512, machine-learning system 522 may be a component of the managing computing system or a component of a separate computing system. Machine-learning system 522 may also be a part of the same computing system as machine-learning system 502 and machine-learning system 512 or a separate computing system.

The managing computing system inputs a set of surrounding-area data 524, a set of vehicle-status data 526, and a set of vehicle-profile data 528 into machine-learning system 522. Machine-learning system 522 then analyzes the input data and identifies an electric vehicle that, in this example, could be redirected to the power-transmission area at the particular point in time. This may involve identifying, based on surrounding-area data 524 and vehicle-status data 526, a vehicle that could feasibly travel to the power-transmission area by the particular point in time, determine the consequences of a changed route that would cause the vehicle to travel to the power-transmission area by the particular point in time. These consequences may then be compared against the vehicle's restrictions and preferences available from vehicle-profile data 528 to predict the likelihood that the vehicle would accept the changed route.

Surrounding area data 528 may include, for example, whether a nearby power-transmission area is predicted to have an excess number of electric vehicles or too few electric vehicles during the particular time. In this example, if nearby power-transmission area were able to efficiently transfer electric charge to all vehicles even if one vehicle were redirected to another power-transmission area, the vehicles that are predicted to be within that nearby power-transmission area may be analyzed for likelihood of rerouting.

Vehicle-status data 526 may include, for example, various statuses of a vehicle that may be selected for rerouting. For example, GPS and map data from travel data 514 may be reused in vehicle-status data 526 to analyze a vehicle's historical travel data and current travel data (e.g., its current position, direction, and speed). A calendar associated with the vehicle (e.g., the calendar stored on the driver's or a passenger's smartphone) may be analyzed to determine if the vehicle has a time by which it must reach a certain destination. The available charge remaining on the vehicle's battery may be measured, as well as the transfer interfaces by which the vehicle can accept electric charge for that battery. The vehicle's battery's history may be analyzed to determine historical charge patterns (e.g., the battery is charged while travelling every day at 5:00 PM, the battery is fully drained once every month, the battery is only charged above 80% twice a month).

Vehicle-profile data 528 may generally relate to preferences a user of the electric vehicle may have related to charging the vehicle's battery and the conditions under which a user of the electric vehicle historically accepts change routes. This data may be in the form of preferences (e.g., users of vehicle prefer to charge in the morning) or restrictions (e.g., users of vehicle will not accept a changed route that causes the remaining charge in the vehicle to drop to 5%).

Vehicle-profile data 528 may be data that is, for example, compiled by the managing computer system or provided by a user of the electric vehicle. For example, the managing computing system may store a history of when users of the electric vehicle accepted changed routes and when users of the electric vehicle rejected changed routes. These conditions may include, for example, the cost of charging in the power-transmission area at the historical time compared to the cost of charging elsewhere (e.g., the price per megawatt hour in a residential grid, the cost of charging in other power-transmission areas), the amount of delay caused by accepting the changed route, the roads and intersection types (e.g., stop lights) on the changed routes, speed of changed routes, battery status after the changed route, numbers of changed routes accepted each month, and others. In some embodiments, all of this data may be provided by a user of the electric vehicle, as well as others.

Machine-learning system 522 analyzes the surrounding-area data 524, the vehicle-status data 526, and the vehicle-profile data 528 to predict a vehicle 530 that was not predicted by machine-learning system 512 to be within the power-transmission area at the particular time and that would be likely to accept a changed route that would cause the vehicle to be within the power-transmission area at the particular time. As illustrated in FIG. 5, machine-learning system 522 outputs a single electric vehicle, as the discrepancy between the predicted ability 510 and the predicted number of vehicles 520 was also a single electric vehicle. In circumstances in which the discrepancy was larger, more electric vehicles may be selected in by machine-learning system 522. The output of machine-learning system 522 can then be utilized by the managing computing system to select a vehicle to which to send rerouting information to adjust the number of electric vehicles that are likely to be requesting electric charge within the power-transmission area at the particular point in time.

Figure 6:
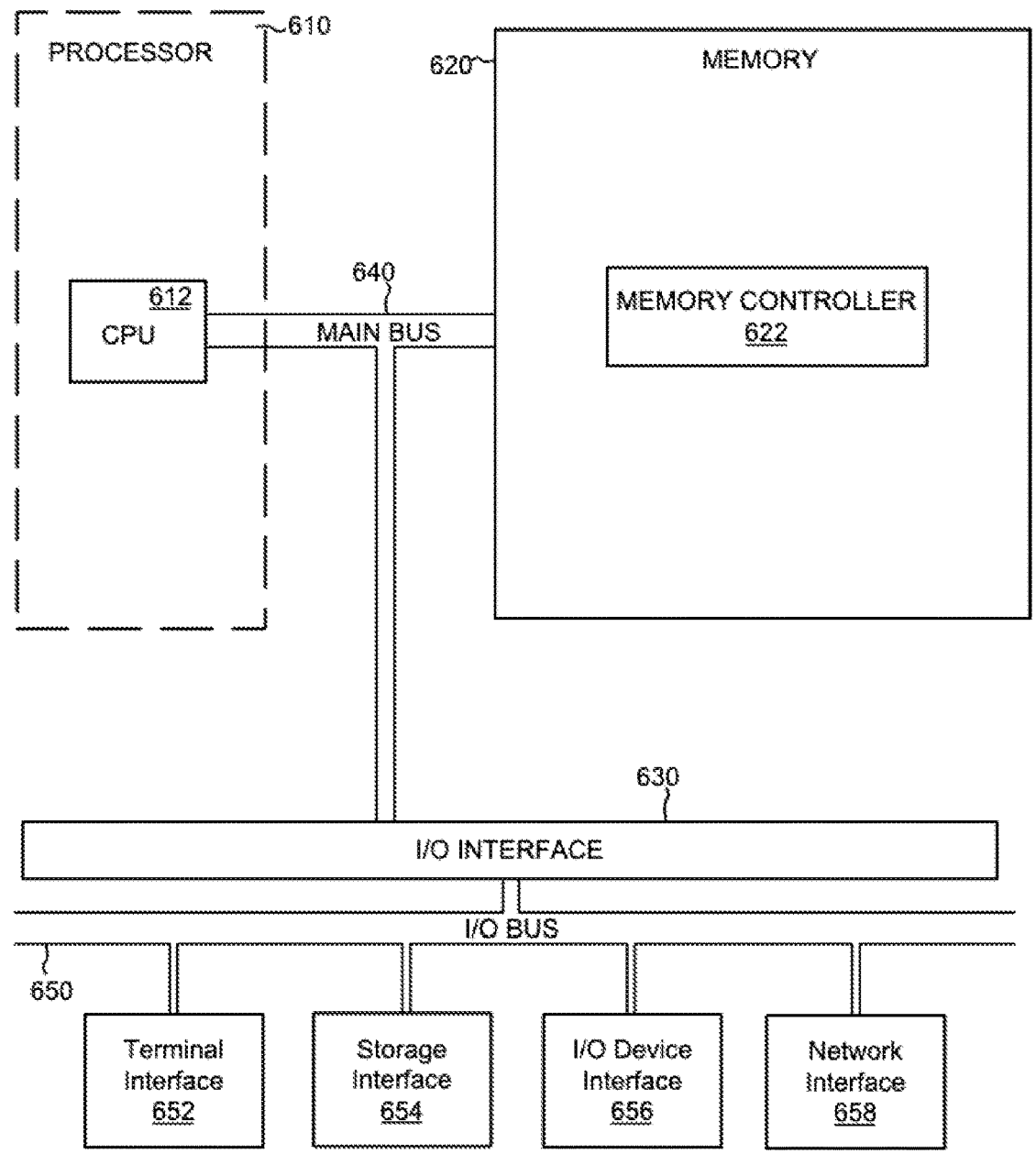
FIG. 6 discloses a computer system that may be used to perform some of the processes disclosed in the embodiments of the present disclosure.

FIG. 6 depicts the representative major components of an example Computer System 601 that may be used in accordance with embodiments of the present disclosure. Computer System 601 may be, for example, computer system that manages a power-transmission area, such as the computer systems referenced by the discussions of FIGS. 1-4B or the managing computer system referenced by the discussion of FIG. 5.

The particular components depicted are presented for the purpose of example only and are not necessarily the only such variations. The Computer System 601 may include a Processor 610, Memory 620, an Input/Output Interface (also referred to herein as I/O or I/O Interface) 630, and a Main Bus 640. The Main Bus 640 may provide communication pathways for the other components of the Computer System 601. In some embodiments, the Main Bus 640 may connect to other components such as a specialized digital signal processor (not depicted).

The Processor 610 of the Computer System 601 may include one or more CPUs 612. The Processor 610 may additionally include one or more memory buffers or caches (not depicted) that provide temporary storage of instructions and data for the CPU 612. The CPU 612 may perform instructions on input provided from the caches or from the Memory 620 and output the result to caches or the Memory 620. The CPU 612 may include one or more circuits configured to perform one or more methods consistent with embodiments of the present disclosure. In some embodiments, the Computer System 601 may contain multiple Processors 610 typical of a relatively large system. In other embodiments, however, the Computer System 601 may contain a single processor with a singular CPU 612.

The Memory 620 of the Computer System 601 may include a Memory Controller 622 and one or more memory modules for temporarily or permanently storing data (not depicted). In some embodiments, the Memory 620 may include a random-access semiconductor memory, storage device, or storage medium (either volatile or non-volatile) for storing data and programs. The Memory Controller 622 may communicate with the Processor 610, facilitating storage and retrieval of information in the memory modules. The Memory Controller 622 may communicate with the I/O Interface 630, facilitating storage and retrieval of input or output in the memory modules. In some embodiments, the memory modules may be dual in-line memory modules.

The I/O Interface 630 may include an I/O Bus 650, a Terminal Interface 652, a Storage Interface 654, an I/O Device Interface 656, and a Network Interface 658. The I/O Interface 630 may connect the Main Bus 640 to the I/O Bus 650. The I/O Interface 630 may direct instructions and data from the Processor 610 and Memory 620 to the various interfaces of the I/O Bus 650. The I/O Interface 630 may also direct instructions and data from the various interfaces of the I/O Bus 650 to the Processor 610 and Memory 620. The various interfaces may include the Terminal Interface 652, the Storage Interface 654, the I/O Device Interface 656, and the Network Interface 658. In some embodiments, the various interfaces may include a subset of the aforementioned interfaces (e.g., an embedded computer system in an industrial application may not include the Terminal Interface 652 and the Storage Interface 654).

Logic modules throughout the Computer System 601— including but not limited to the Memory 620, the Processor 610, and the I/O Interface 630—may communicate failures and changes to one or more components to a hypervisor or operating system (not depicted). The hypervisor or the operating system may allocate the various resources available in the Computer System 601 and track the location of data in Memory 620 and of processes assigned to various CPUs 612. In embodiments that combine or rearrange elements, aspects of the logic modules' capabilities may be combined or redistributed. These variations would be apparent to one skilled in the art.

As has been discussed previously, a machine-learning system may process and analyze input data (here, one or more of power-transfer ability data, such as weather data, energy-storage data power-planning data; vehicle-prediction data, such as travel data, road data, and charge-request data; and adjustment data, such as surrounding-area data, vehicle-status data, and vehicle-profile data) by recognizing patterns in the input data and comparing those recognized patterns to patterns related to historical abilities to transfer electric charge, numbers of vehicles requesting electric charge, and successful adjustments to numbers of vehicles requesting electric charge. For example, a machine-learning system may recognize several patterns in the GPS data expressed by one or more input vectors for a particular time period. The machine-learning system may then associate some of those patterns with the patterns associated with historical GPS data for historical time periods that the machine-learning system has been trained (e.g., by human-supervised training or automatic training) to predict numbers of electric vehicles that are likely to request electric charge.

In some embodiments, data input into a machine-learning system, such as a neural network, may take the form of a vector. A vector may be a one-dimension matrix (e.g., a matrix with one row and many columns) of numbers, each of which expresses data related to, for example, weather data, energy-storage data, and power-planning data. A vector may also be referred to herein as an "input vector," a "feature vector," or a "multi-dimension vector." For example, as previously discussed, this vector may include current or forecasted amounts of wind, cloud cover, temperature, amounts of stored electricity available for use, demand on the power grid, power schedules, and others.

Figure 7:
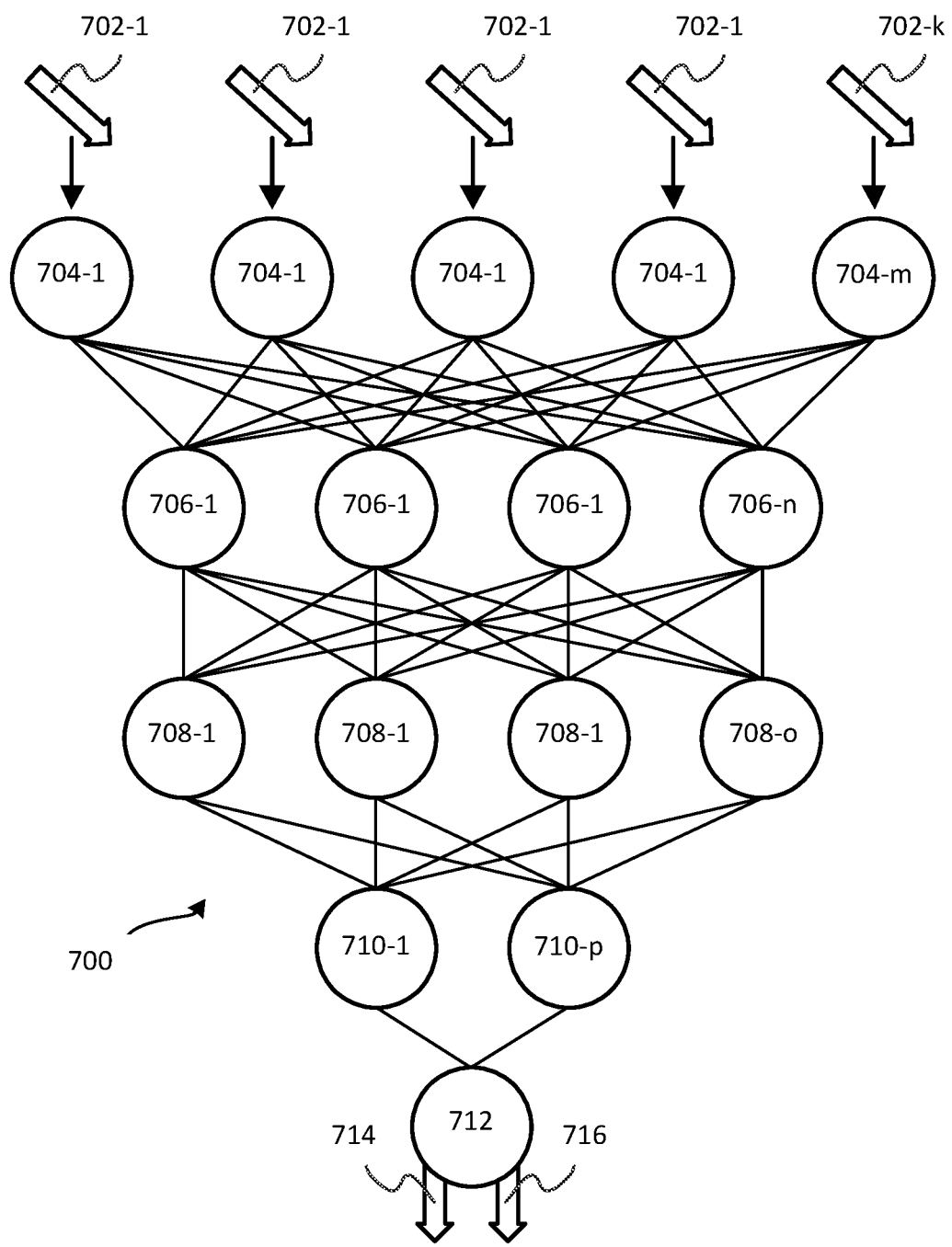
FIG. 7 illustrates the representative major components of a machine-learning system that may be used in accordance with embodiments.

Such a machine-learning system is illustrated in FIG. 7. In FIG. 7, neural network 700 may be trained to predict, for example, a number of electric vehicles to which a power-transmission device could efficiently transfer electric charge, a number of vehicles that are likely to be requesting electric charge, or the likelihood of an adjustment to cause a change in the number of vehicles that are likely to be requesting electric charge. The inputs of neural network 700 are represented by feature vectors 702-1 through 702-$k$. These feature vectors may contain all information that is available to a computer system that is managing a power-transmission area. In some embodiments, feature vectors 702-1 through 702-$k$ may be identical copies of each other. In some embodiments, more of instances of feature vectors 702 may be utilized. The number of feature vectors 702-1 through 702-$k$ may correspond to the number of neurons in feature layer 704. In other words, in some embodiments, the number of inputs 702-1 through 702-$k$ (i.e., the number represented by m) may equal (and thus be determined by) the number of first-layer neurons in the network. In other embodiments, neural network 700 may incorporate 1 or more bias neurons in the first layer, in which case the number of inputs 702-1 through 702-$k$ may equal the number of first-layer neurons in the network minus the number of first-layer bias neurons.

Feature layer 704 contains neurons 701-1 through 701-$m$. Neurons 704-1 through 704-$m$ accept as inputs feature vectors 702-1 through 702-$k$ and process the information therein. Once vectors 702-1 through 702-$k$ are processed, neurons 704-1 through 704-$m$ provide the resulting values to the neurons in hidden layer 706. These neurons, 706-1 through 706-$n$, further process the information, and pass the resulting values to the neurons in hidden layer 708. Similarly, neurons 708-1 through 708-o further process the information and pass it to neurons 710-1 through 710-p. Neurons 710-1 thorough 710-p process the data and deliver it to the output layer of the neural network, which, as illustrated, contains neuron 712. Neuron 712 may be trained to calculate two values—value 714 and value 716. Value 714 may represent the likelihood that a number of vehicles that request electric charge at a particular time is equal to a value or is greater than (or less than) a threshold value. Value 716, on the other hand, may represent the likelihood that the number of vehicles that request electric charge is not equal to a value or is not greater than (or less than) a threshold value.

In some embodiments, neural network 700 may have more than 5 layers of neurons (as presented) or fewer than 5 layers. These 5 layers may each comprise the same amount of neurons as any other layer, more neurons than any other layer, fewer neurons than any other layer, or more neurons than some layers and fewer neurons than other layers. Finally, in some embodiments, the output of output layer 712 may be used to determine whether an adjustment to the number of vehicles that are likely to request electric charge is necessary and whether the adjustment is likely to be successful/accepted.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    identifying an ability of a power-transmission device to transfer electric charge in a power-transmission area at a particular point in time, wherein the ability comprises a threshold number of vehicles to which the power-transmission device can transfer electric charge with at least a threshold efficiency;
    calculating a predicted number of electric vehicles that are likely to be requesting electric charge within the power-transmission area at the particular point in time;
    determining that the predicted number of vehicles is not bound by the threshold number of vehicles; and
    adjusting, by deactivating the power-transmission device and based on the determining, the number of electric vehicles that are likely to be requesting electric charge within the power-transmission area at the particular point in time.

2. The method of claim 1, wherein the adjusting comprises:
    selecting an electric vehicle; and
    issuing rerouting information to the electric vehicle, wherein the rerouting information contains a changed route that, when followed by the electric vehicle, changes the number of electric vehicles that are likely to be requesting electric charge within the power-transmission area at the particular point in time.

3. The method of claim 2, wherein the selected electric vehicle is in the predicted number of electric vehicles and wherein the changed route would cause the electric vehicle to be not present in the power-transmission area at the particular point in time.

4. The method of claim 2, wherein the selected electric vehicle is not in the predicted number of electric vehicles and wherein the changed route would cause the electric vehicle to be present in the power-transmission area at the particular point in time.

5. The method of claim 2, wherein the selecting comprises:
    identifying a consequence of the changed route;
    comparing the consequence of the changed route to a profile for the electric vehicle; and
    determining, based on the comparing, that the consequence does not violate a restriction in the profile.

6. The method of claim 5, wherein the consequence of the changed route comprises a predicted remaining charge of the electric vehicle after following the changed route.

7. The method of claim 5, wherein the consequence of the changed route comprises a time of completion of the changed route.

8. The method of claim 5, wherein the consequence of the changed route comprises a number of reroute instructions issued to the electric vehicles over a period of time.

9. The method of claim 1, wherein the adjusting comprises changing a speed limit in the power-transmission area.

10. The method of claim 1, wherein the adjusting comprises a cost of electric charge in the power-transmission area.

11. The method of claim 1, wherein the adjusting comprises changing a direction of a lane in the power-transmission area.

12. The method of claim 1, wherein the calculating comprises:
    identifying a set of road properties during the particular point in time;
    identifying a set of historical road properties that matches the set of road properties; and
    identifying a historical number of electric vehicles that requested electric charge during a historical point in time that corresponds to the historical road properties.

13. A system comprising:
    a processor; and
    a memory in communication with the processor, the memory containing program instructions that, when executed by the processor, are configured to cause the processor to perform a method, the method comprising:
        identifying an ability of a power-transmission device to transfer electric charge in a power-transmission area at a particular point in time, wherein the ability comprises a threshold number of vehicles to which the power-transmission device can transfer electric charge with at least a threshold efficiency;
        calculating a predicted number of electric vehicles that are likely to be requesting electric charge within the power-transmission area at the particular point in time;
        determining that the predicted number of vehicles is not bound by the threshold number of vehicles; and
        adjusting, by deactivating the power-transmission device and based on the determining, the number of electric vehicles that are likely to be requesting electric charge within the power-transmission area at the particular point in time.

14. The system of claim 13, wherein the adjusting comprises:
    selecting an electric vehicle; and
    issuing rerouting information to the electric vehicle, wherein the rerouting information contains a changed route that, if followed by the electric vehicle, would change the number of electric vehicles that are likely to be requesting electric charge within the power-transmission area at the particular point in time.

15. The system of claim 13, wherein the adjusting comprises a cost of electric charge in the power-transmission area.

16. The system of claim 14, wherein the calculating comprises:
    identifying a set of road properties during the particular point in time;
    identifying a set of historical road properties that matches the set of road properties; and
    identifying a historical number of electric vehicles that requested electric charge during a historical point in time that corresponds to the historical road properties.

17. A computer program product, the computer program product comprising a computer readable storage medium having program instructions embodied therewith, the program instructions executable by a computer to cause the computer to:
    identify an ability of a power-transmission device to transfer electric charge in a power-transmission area at a particular point in time, wherein the ability comprises a threshold number of vehicles to which the power-transmission device can transfer electric charge with at least a threshold efficiency;
    calculate a predicted number of electric vehicles that are likely to be requesting electric charge within the power-transmission area at the particular point in time;
    determine that the predicted number of vehicles is not bound by the threshold number of vehicles; and
    adjust, by deactivating the power-transmission device and based on the determining, the number of electric vehicles that are likely to be requesting electric charge within the power-transmission area at the particular point in time.

18. The computer program product of claim 17, wherein the program instructions are further executable by the computer to cause the computer to:
    select an electric vehicle; and
    issue rerouting information to the electric vehicle, wherein the rerouting information contains a changed route that, if followed by the electric vehicle, would change the number of electric vehicles that are likely to be requesting electric charge within the power-transmission area at the particular point in time.

19. The computer program product of claim 17, wherein the adjusting comprises changing a direction of a lane in the power-transmission area.

20. The computer program product of claim 17, wherein the calculating comprises:
    identifying a set of road properties during the particular point in time;
    identifying a set of historical road properties that matches the set of road properties; and
    identifying a historical number of electric vehicles that requested electric charge during a historical point in time that corresponds to the historical road properties.

* * * * *